United States Patent
Sun et al.

(10) Patent No.: US 10,575,324 B2
(45) Date of Patent: Feb. 25, 2020

(54) EFFICIENT BLIND DECODING OF A SEARCH SPACE

(71) Applicant: QUALCOMM Incorporated, San Diego, CA (US)

(72) Inventors: Jing Sun, San Diego, CA (US); Wanshi Chen, San Diego, CA (US); Tao Luo, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/711,044

(22) Filed: Sep. 21, 2017

(65) Prior Publication Data

US 2018/0132272 A1 May 10, 2018

Related U.S. Application Data

(60) Provisional application No. 62/417,516, filed on Nov. 4, 2016.

(51) Int. Cl.
*H04W 72/12* (2009.01)
*H04L 1/00* (2006.01)
(Continued)

(52) U.S. Cl.
CPC ....... *H04W 72/1289* (2013.01); *H04L 1/0038* (2013.01); *H04L 1/0045* (2013.01);
(Continued)

(58) Field of Classification Search
CPC ............. H04W 72/1289; H04W 48/12; H04W 72/0466; H04L 5/0053; H04L 1/0072; H04L 1/0061; H04L 1/0038; H04L 1/0045
See application file for complete search history.

(56) References Cited

U.S. PATENT DOCUMENTS

| | | |
|---|---|---|
| 2010/0303011 A1 | 12/2010 | Pan et al. |
| 2014/0050192 A1 | 2/2014 | Kim et al. |
| 2015/0139123 A1 | 5/2015 | McBeath et al. |

OTHER PUBLICATIONS

Huawei, et al., "DCI design for short TTI", 3GPP Draft; R1-164060, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 14, 2016 (May 14, 2016), 15 Pages, XP051096624, Retrieved from the Internet: URL: http://www.3gpp.org/ftp/tsg_ran/WG1_RL1/TSGR1_85/Docs/ [retrieved on May 14, 2016].

(Continued)

*Primary Examiner* — Jackie Zuniga Abad
(74) *Attorney, Agent, or Firm* — Holland & Hart LLP

(57) ABSTRACT

Methods, systems, and devices for wireless communication are described for efficient blind decoding of a search space. A single DCI message may be divided and encoded into multiple element downlink control information (eDCI) components. Each eDCI may be independently encoded and thus independently decodable. A base eDCI may link to one or more associated extended eDCIs. A UE may identify a base eDCI corresponding to a radio network identifier associated with the UE, parse the base eDCI to obtain the base payload, determine the location of the one or more associated extended eDCIs based at least in part on the base eDCI, and parse the extended eDCI to obtain the one or more associated extended payloads. The UE may communicate based at least in part on a DCI message formed by combining the base payload and the one or more associated extended payloads.

30 Claims, 17 Drawing Sheets

(51) Int. Cl.
*H04L 5/00* (2006.01)
*H04W 48/12* (2009.01)
*H04W 72/04* (2009.01)

(52) U.S. Cl.
CPC .......... *H04L 1/0061* (2013.01); *H04L 1/0072* (2013.01); *H04L 5/0053* (2013.01); *H04W 48/12* (2013.01); *H04W 72/0466* (2013.01)

(56) References Cited

OTHER PUBLICATIONS

International Search Report and Written Opinion—PCT/US2017/053020—ISA/EPO—dated Jan. 4, 2018.
Qualcomm Incorporated: "Downlink Design for Shortened TTI", 3GPP Draft; R1-1610007 DL Design for Shortened TTI, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), pp. 1-3, XP051150032, Retrieved from the Internet: URL: http://www.3gpp.org/ftp/Meetings_3GPP_SYNC/RAN1/Docs/ [retrieved on Oct. 9, 2016].

EFFICIENT BLIND DECODING OF A SEARCH SPACE

CROSS REFERENCES

The present application for patent claims priority to U.S. Provisional Patent Application No. 62/417,516 by SUN, et al., entitled "Efficient Blind Decoding of a Search Space," filed Nov. 4, 2016, assigned to the assignee hereof and expressly incorporated herein for any and all purposes.

BACKGROUND

The following relates generally to wireless communication, and more specifically to efficient blind decoding of a search space.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In LTE systems, a physical downlink control channel (PDCCH) carries data and signaling information to a user equipment, including downlink control information (DCI) messages. A DCI message includes information regarding downlink scheduling assignments, uplink resource grants, transmission scheme, uplink power control, hybrid automatic return repeat request (HARQ) information, modulation and coding schemes (MCS) and other information. A DCI message can be UE-specific (dedicated to a single UE) or cell-specific (common across multiple UEs) and placed in different dedicated and common search spaces within the PDCCH depending on a format of the DCI message. A UE attempts to decode a DCI by performing a process known as a blind decode, during which multiple decode attempts are carried out in the dedicated and common search spaces until the DCI message is detected. Conventional blind decodes are inefficient and require an excessive number of decoding operations.

SUMMARY

The described techniques relate to improved methods, systems, devices, or apparatuses that support efficient blind decoding of a search space. Generally, the described techniques provide for splitting a single downlink control information (DCI) message into multiple element downlink control information (eDCI) components. A base station may create a base eDCI that is linked to one or more extended eDCIs. Each eDCI may be independently encoded and thus independently decodable. The eDCIs corresponding to a single DCI message may be linked together in a search space of a control channel. A user equipment (UE) may monitor the search space for the base eDCI and use the linkage to retrieve the one or more extended eDCIs associated with the base eDCI. The UE may parse a base payload from the base eDCI and one or more associated extended payloads from the associated extended eDCIs. The UE may combine the base eDCI and the one or more associated extended eDCIs to recover the DCI message, and communicate using the recovered DCI message.

A method of wireless communication is described. The method may include monitoring a search space of a control channel for eDCI by decoding a set of decoding candidates within the search space to generate a set of decoding outputs, identifying, among the set of decoding outputs, a base eDCI corresponding to a radio network identifier, parsing the base eDCI to obtain a base payload, determining a location of an extended eDCI within the set of decoding outputs based at least in part on the base eDCI, parsing the extended eDCI to obtain an extended payload, and communicating based at least in part on a DCI message formed by combining the base payload and the extended payload.

An apparatus for wireless communication is described. The apparatus may include means for monitoring a search space of a control channel for eDCI by decoding a set of decoding candidates within the search space to generate a set of decoding outputs, identifying, among the set of decoding outputs, a base eDCI corresponding to a radio network identifier, parsing the base eDCI to obtain a base payload, determining a location of an extended eDCI within the set of decoding outputs based at least in part on the base eDCI, parsing the extended eDCI to obtain an extended payload, and communicating based at least in part on a DCI message formed by combining the base payload and the extended payload.

Another apparatus for wireless communication is described. The apparatus may include a processor, memory in electronic communication with the processor, and instructions stored in the memory. The instructions may be operable to cause the processor to monitor a search space of a control channel for eDCI by decoding a set of decoding candidates within the search space to generate a set of decoding outputs, identify, among the set of decoding outputs, a base eDCI corresponding to a radio network identifier, parse the base eDCI to obtain a base payload, determine a location of an extended eDCI within the set of decoding outputs based at least in part on the base eDCI, parse the extended eDCI to obtain an extended payload, and communicate based at least in part on a DCI message formed by combining the base payload and the extended payload.

A non-transitory computer readable medium for wireless communication is described. The non-transitory computer-readable medium may include instructions operable to cause a processor to monitor a search space of a control channel for eDCI by decoding a set of decoding candidates within the search space to generate a set of decoding outputs, identify, among the set of decoding outputs, a base eDCI corresponding to a radio network identifier, parse the base eDCI to obtain a base payload, determine a location of an extended eDCI within the set of decoding outputs based at least in part on the base eDCI, parse the extended eDCI to obtain an extended payload, and communicate based at least in part on a DCI message formed by combining the base payload and the extended payload.

In some examples of the method, apparatus, and non-transitory computer-readable medium described above, determining the location of the extended eDCI comprises determining the location of the extended eDCI within the set of decoding outputs relative to a location of the base eDCI. In some examples, determining the location of the extended eDCI comprises processing the base eDCI to obtain the location of the extended eDCI within the set of decoding outputs.

Some examples of the method, apparatus, and non-transitory computer-readable medium described above may further include processes, features, means, or instructions for detecting that a link in the extended eDCI corresponds to a location of the base eDCI within the search space. Some examples of the method, apparatus, and non-transitory computer-readable medium described above may further include processes, features, means, or instructions for determining that a length of the base payload combined with the extended payload corresponds to an expected length of the DCI message, and determining that the DCI message is a complete DCI message based at least in part on the expected length of the DCI message.

In some examples of the method, apparatus, and non-transitory computer-readable medium described above, determining that the DCI message is a complete DCI message is based at least in part on a payload of a candidate extended eDCI within the set of decoding outputs failing an error detecting algorithm.

Some examples of the method, apparatus, and non-transitory computer-readable medium described above may further include processes, features, means, or instructions for determining a location of a second extended eDCI within the set of decoding outputs based at least in part on the extended eDCI, parsing the second extended eDCI to obtain a second extended payload, and combining the base payload, the extended payload, and the second extended payload based at least in part on determining that the second extended payload has successfully passed an error detecting algorithm.

Some examples of the method, apparatus, and non-transitory computer-readable medium described above may further include processes, features, means, or instructions for descrambling an error detecting code from the base eDCI using the radio network identifier to generate a descrambled error detecting code, wherein the descrambled error detecting code corresponds to the base payload, applying an error detection algorithm to the base payload to generate a calculated error detecting code, and determining a successful decode of the base payload based at least in part on the descrambled received error detecting code and the calculated error detecting code.

Some examples of the method, apparatus, and non-transitory computer-readable medium described above may further include processes, features, means, or instructions for processing the extended eDCI to obtain a received error detecting code corresponding to the extended payload, applying an error detection algorithm to the extended payload to generate a calculated error detecting code, and determining a successful decode of the extended payload based at least in part on the received error detecting code and the calculated error detecting code.

Some examples of the method, apparatus, and non-transitory computer-readable medium described above may further include processes, features, means, or instructions for decoding at least one other extended eDCI, processing the extended eDCI and the at least one other extended eDCI to obtain a combined extended payload and a received error detecting code corresponding to the combined extended payload, applying an error detection algorithm to the combined extended payload to generate a calculated error detecting code, and determining a successful decode of the combined extended payload based at least in part on the received error detecting code and the calculated error detecting code.

Some examples of the method, apparatus, and non-transitory computer-readable medium described above may further include processes, features, means, or instructions for processing configuration data specifying the set of decoding candidates within the search space or an aggregation level indicating a number of control channel elements within the search space for each of the decoding candidates.

In some examples of the method, apparatus, and non-transitory computer-readable medium described above, the set of decoding candidates corresponds to a plurality of possible DCI formats and a plurality of possible aggregation levels, and each of the plurality of possible DCI formats corresponds to a same base eDCI length for each of the plurality of aggregation levels.

A method of wireless communication is described. The method may include generating a DCI message for a UE, dividing the DCI message into a base payload and an extended payload, independently encoding the base payload and the extended payload to obtain a base eDCI and an extended eDCI, linking the base eDCI with the extended eDCI in a search space of a control channel, and transmitting the base eDCI and the extended eDCI to the UE in the search space.

An apparatus for wireless communication is described. The apparatus may include means for generating a DCI message for a UE, dividing the DCI message into a base payload and an extended payload, independently encoding the base payload and the extended payload to obtain a base eDCI and an extended eDCI, linking the base eDCI with the extended eDCI in a search space of a control channel, and transmitting the base eDCI and the extended eDCI to the UE in the search space.

Another apparatus for wireless communication is described. The apparatus may include a processor, memory in electronic communication with the processor, and instructions stored in the memory. The instructions may be operable to cause the processor to generate a DCI message for a UE, divide the DCI message into a base payload and an extended payload, independently encode the base payload and the extended payload to obtain a base eDCI and an extended eDCI, link the base eDCI with the extended eDCI in a search space of a control channel, and transmit the base eDCI and the extended eDCI to the UE in the search space.

A non-transitory computer readable medium for wireless communication is described. The non-transitory computer-readable medium may include instructions operable to cause a processor to generate a DCI message for a UE, divide the DCI message into a base payload and an extended payload, independently encode the base payload and the extended payload to obtain a base eDCI and an extended eDCI, link the base eDCI with the extended eDCI in a search space of a control channel, and transmit the base eDCI and the extended eDCI to the UE in the search space.

In some examples of the method, apparatus, and non-transitory computer-readable medium described above, independently encoding the base payload comprises determining a radio network identifier associated with the UE, generating an error detecting code for the base payload using an error detection algorithm, and scrambling the error detecting code based at least in part on the radio network identifier. In some examples, independently encoding the extended payload comprises generating an error detecting code corresponding to the extended payload, and mapping the extended payload and the error detecting code to a single extended eDCI. In some examples, independently encoding the extended payload comprises generating an error detecting code corresponding to the extended payload, wherein the extended eDCI is one of a plurality of extended eDCIs, and portions of the extended payload, the error detecting code, or both are included in two or more extended eDCIs of the plurality of extended eDCIs.

Some examples of the method, apparatus, and non-transitory computer-readable medium described above may further include processes, features, means, or instructions for transmitting, to the UE, configuration data specifying a set of decoding candidates within the search space of the control channel or an aggregation level indicating a number of control channel elements for each of the base eDCI and the extended eDCI.

In some examples of the method, apparatus, and non-transitory computer-readable medium described above, dividing the DCI message into a base payload and an extended payload comprises determining a length of the DCI message, allocating to the base payload a portion of the DCI message having a length equal to a fixed base eDCI length, and allocating to the extended payload a remaining portion of the DCI message. In some examples, the base eDCI and each extended eDCI are of an equal and fixed length.

DETAILED DESCRIPTION

Figure 1:
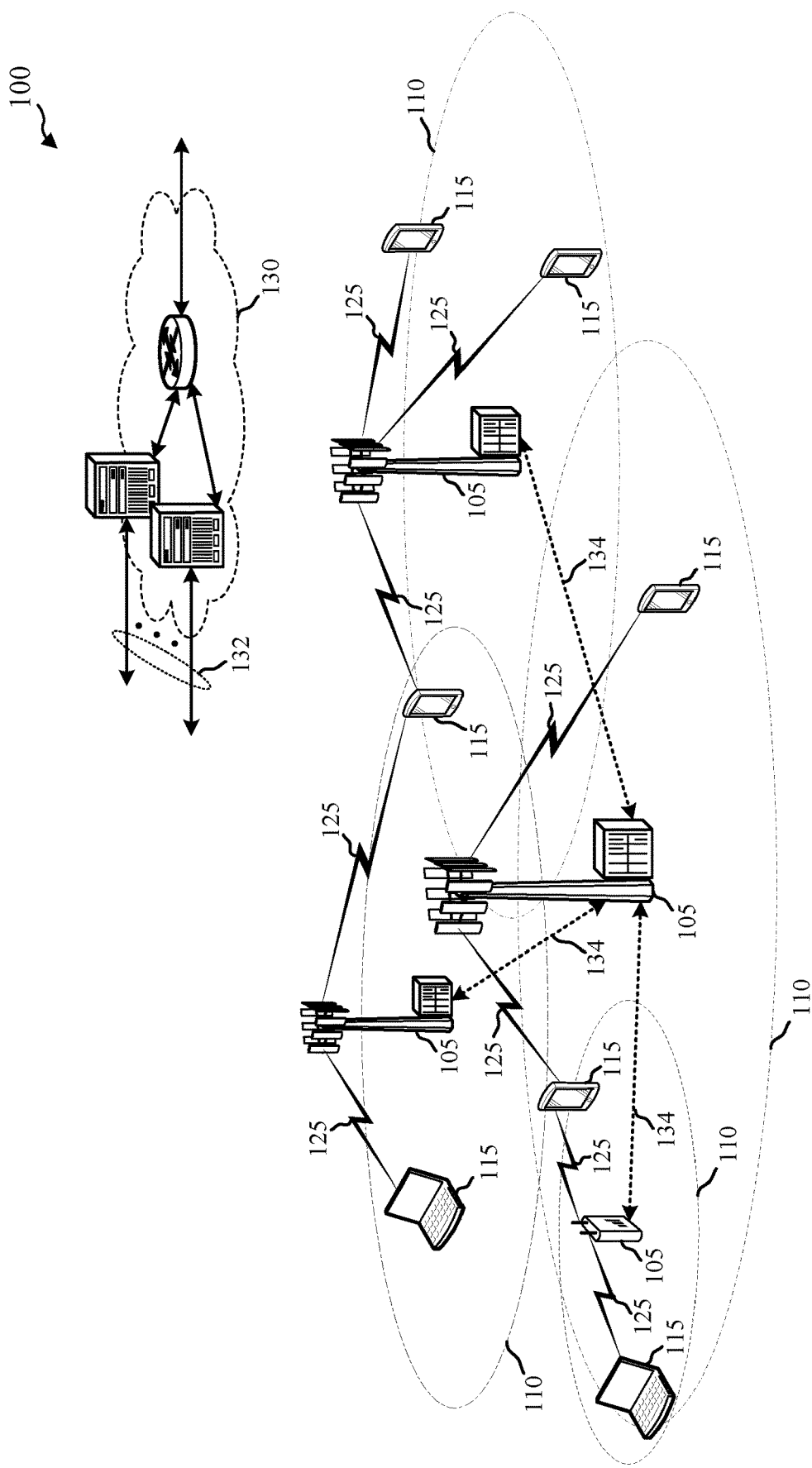
FIG. 1 illustrates an example of a system for wireless communication that supports efficient blind decoding of a search space in accordance with aspects of the present disclosure.

The described techniques relate to improved methods, systems, devices, or apparatuses that support efficient blind decoding of a search space. Conventional blind decoding techniques inefficiently require duplicative decoding of DCI bits mapped to control channel elements (CCEs) within a search space. In legacy Long Term Evolution (LTE) systems, for example, a physical downlink control channel (PDCCH) carries downlink control information (DCI). DCI may include information regarding downlink scheduling assignments, uplink resource grants, transmission scheme, uplink power control, hybrid automatic return repeat request (HARD) information, modulation and coding schemes (MCS) and other information. Some DCI may be common across multiple UEs (common DCI), and some DCI may be specific to a single UE (dedicated DCI). Common DCI may be included in a PDCCH transmission as part of a common search space, and dedicated DCI may be included in a PDCCH transmission as part of a dedicated (UE-specific) search space. A UE may be configured to search one or more common or dedicated search spaces for DCI messages applicable to the UE. The UE attempts to decode the DCI through a process known as a blind decode, during which the UE carries out multiple decode attempts in the dedicated and common search spaces until a DCI message is detected.

DCI messages may be formatted according to predefined DCI formats, with each DCI format having a corresponding message size or length. For example, in legacy LTE, a DCI message having DCI format 1A may be defined as having a size of 45 bits, while a DCI message having DCI format 1C may be defined as having a size of 31 bits. Other DCI formats, with different corresponding messages sizes, may be defined. A single DCI message may be mapped to one or more CCEs based on a size of the DCI message, and may be assigned an aggregation level depending on the number of CCEs used by that DCI message. For instance aggregation level 1 may be assigned to a DCI message that uses one CCE, aggregation level 2 may be assigned to a DCI message that uses two CCEs, aggregation level 4 may be assigned to a DCI message that uses four CCEs, etc. The addition of aggregation levels increases the number of blind decodes performed by a UE 115, as a UE may be initially unaware of the length of a DCI message intended for the UE. That is, the UE may blind decode potential DCI messages assuming a first aggregation level, then a second aggregation level, etc. until a DCI message intended for the UE is discovered. The blind decoding process may increase latency associated with the UE 115 identifying the intended DCI message and additionally may increase power consumption and consumption of other processing resources. Furthermore, since blind decoding occurs each time a PDCCH (or enhanced PDCCH (ePDCCH)) is received, the impact of blind decoding on power consumption and processing resources may become more significant over time.

Each search space, common or dedicated, may include multiple decoding candidates for the UE to decode, with each decoding candidate corresponding to a particular CCE or group of CCEs within the search space. During a conventional blind decode, a UE is informed of two or more possible lengths of a DCI message and attempts to decode multiple decoding candidates corresponding to the two or more possible lengths. Because of the inefficient relationship between CCEs and bits of the DCI message, and the conventional way DCI messages are encoded, the UE needs to run a decoder two or more times for each decoding candidate. In a typical scenario, a base station appends cyclic redundancy check (CRC) bits at the end of a payload of the DCI message for error detection, and the CRC bits correspond to the entire payload of the DCI message, even if the DCI message spans multiple CCEs. Because of this, performing a CRC check on bits from a first set of CCEs within a search space is irrelevant to performing a CRC check on bits from a second set of CCEs, even if one or more of the CCEs from the second set are common to the first set. Hence, the UE must attempt to decode each decoding candidate separately and cannot reuse any portion of the decoding results from one decoding candidate when decoding another decoding candidate.

To overcome these and other issues with conventional solutions, the described techniques split a DCI message into element DCIs (eDCIs) that are independently encoded (and thus independently decodable) and linked together in a search space. Thus, a first DCI message having a first DCI format may be apportioned into a first set of one or more eDCIs, a second DCI message having a second DCI format may be apportioned into a second set of one or more eDCIs, and so on. Further, each individual eDCI may have a predefined and fixed size, with DCI messages of different sizes communicated via different numbers of fixed-length eDCIs. The size of an individual eDCI may be known a priori to a UE or signaled to the UE. Thus, even if a UE does not initially know the total size of a DCI message, the UE may know the size of each of the eDCIs within the DCI message. Further, the fixed-length eDCI concept may be utilized as part of dynamic length DCI messages in which the number of linked eDCIs used to transmit a single DCI message having a particular DCI format is variable.

To create a DCI message comprising linked eDCIs, a base station may split the DCI message into a base eDCI and one or more extended eDCIs. The base eDCI may link to some or all of the one or more extended eDCIs, while an extended eDCI may link back to the base eDCI and may also link to one or more other extended eDCIs associated with the DCI message. The linkage between eDCIs may be explicit or implicit. For example, an eDCI may include link information that explicitly indicates where at least one associated eDCI is in the search space. As another example, eDCIs may be implicitly linked based on signaled or predetermined offsets relative to one another in the search space.

A base station may transmit a DCI message to a UE by mapping bits of the corresponding base eDCI and one or more extended eDCIs to one or more CCEs in the search space of a control channel. The UE may monitor the search space, identify the base eDCI, and use the linkage to obtain the one or more extended eDCIs associated with the base eDCI. The UE may also obtain an extended eDCI and then use the associated linkage to obtain or confirm other extended eDCIs or a corresponding base eDCI. The UE may combine the base eDCI and the one or more extended eDCIs to recover the DCI message. Beneficially, because each eDCI may be independently encoded and thus independently decodable, once an CCE within the search space has been decoded, the decoded bits may be reused when searching for DCI messages of different lengths that include the same CCE (even though in some cases the decoded bits of an eDCI mapped to the CCE may comprise information that is useful only in conjunction with the decoded bits of one or more other eDCIs, there may be no need to decode the same CCE bits twice). Advantageously, the number of blind decodes is reduced.

Aspects of the disclosure are initially described in the context of a wireless communications system. The wireless communications system may split a DCI message into two or more eDCIs that are each independently encoded, each independently decodable, and each of a predetermined fixed length, which may enable reuse of a decoded eDCI regardless of a total length of the DCI message and thus reduce the number of blind decodes by a UE. Aspects of the disclosure are further illustrated by and described with reference to apparatus diagrams, system diagrams, and flowcharts that relate to efficient blind decoding of a search space.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-Advanced) network, a fifth generation (5G) network, or a New Radio (NR) network. In some cases, wireless communications system 100 may support enhanced broadband communications, ultra-reliable (i.e., mission critical) communications, low latency communications, and communications with low-cost and low-complexity devices. In some examples, a base station 105 may split a DCI message into multiple eDCIs (e.g., a base eDCI and one or more extended eDCIs), independently encode and link the eDCIs, and map the eDCIs to CCEs within a search space. The UE 115 may monitor the search space of the control channel for eDCIs addressed to the UE 115. The UE 115 may combine the base eDCI and the one or more extended eDCIs to recover the DCI message. Different DCI message lengths can be supported by combining a base eDCI with a different number of extended eDCIs.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). As another example, a subframe may comprise only a single slot having a duration of 1 ms, and each slot may contain 12 or 14 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI or a slot. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105. As used herein, TTI refers to any one of a TTI, sTTI, slot, or mini-slot.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may split a DCI message, corresponding to a single DCI format, into two or more eDCIs that are independently encoded and thus independently decodable, enabling reuse of decoded eDCIs by a UE 115 regardless of a total length of the DCI message.

Figure 2:
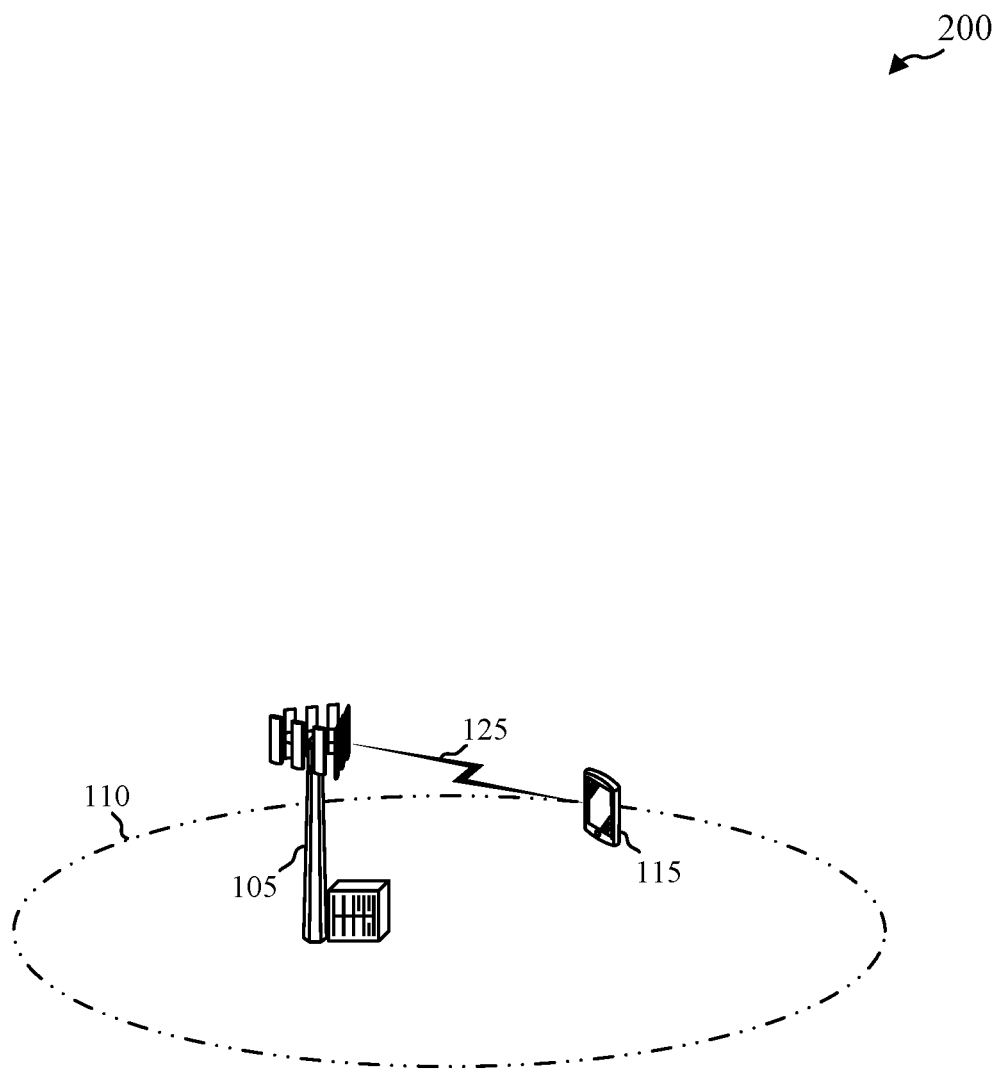
FIG. 2 illustrates an example of a wireless communications system that supports efficient blind decoding of a search space in accordance with aspects of the present disclosure.

FIG. 2 illustrates an example of a wireless communications system 200 for efficient blind decoding of a search space. Wireless communications system 200 may include a base station 105 having a coverage area 110. A UE 115 within the coverage area 110 may be connected to, and communicate with, the base station 105, via communication link 125. Base station 105 in FIG. 2 is an example of a base station 105 in FIG. 1, and UE 115 in FIG. 2 is an example of a UE 115 in FIG. 1.

In some examples, base station 105 may transmit a control channel, such as a PDCCH, in order to convey a DCI message to the UE 115. The DCI message can be UE-specific (dedicated) or cell-specific (common) and placed in different dedicated and common search spaces within the PDCCH depending on a format of the DCI (e.g., format 1, 1A, 1B, 1C, 1D, 2, 2A, and so on), where a DCI format may correspond to a certain message size and type of control information. A single PDCCH may carry DCI messages associated with multiple UEs 115. A particular UE 115 must, therefore, be able to recognize the DCI messages that are intended for it. To that end, a UE 115 may be assigned one or more UE-specific search spaces, which may be in addition to common search spaces allocated to the UE 115 as well as other UEs 115 in the network. The UE 115 may attempt to decode the DCI by performing a process known as a blind decode, during which multiple decode attempts are carried out in the search spaces until the DCI message is detected.

Figure 3:
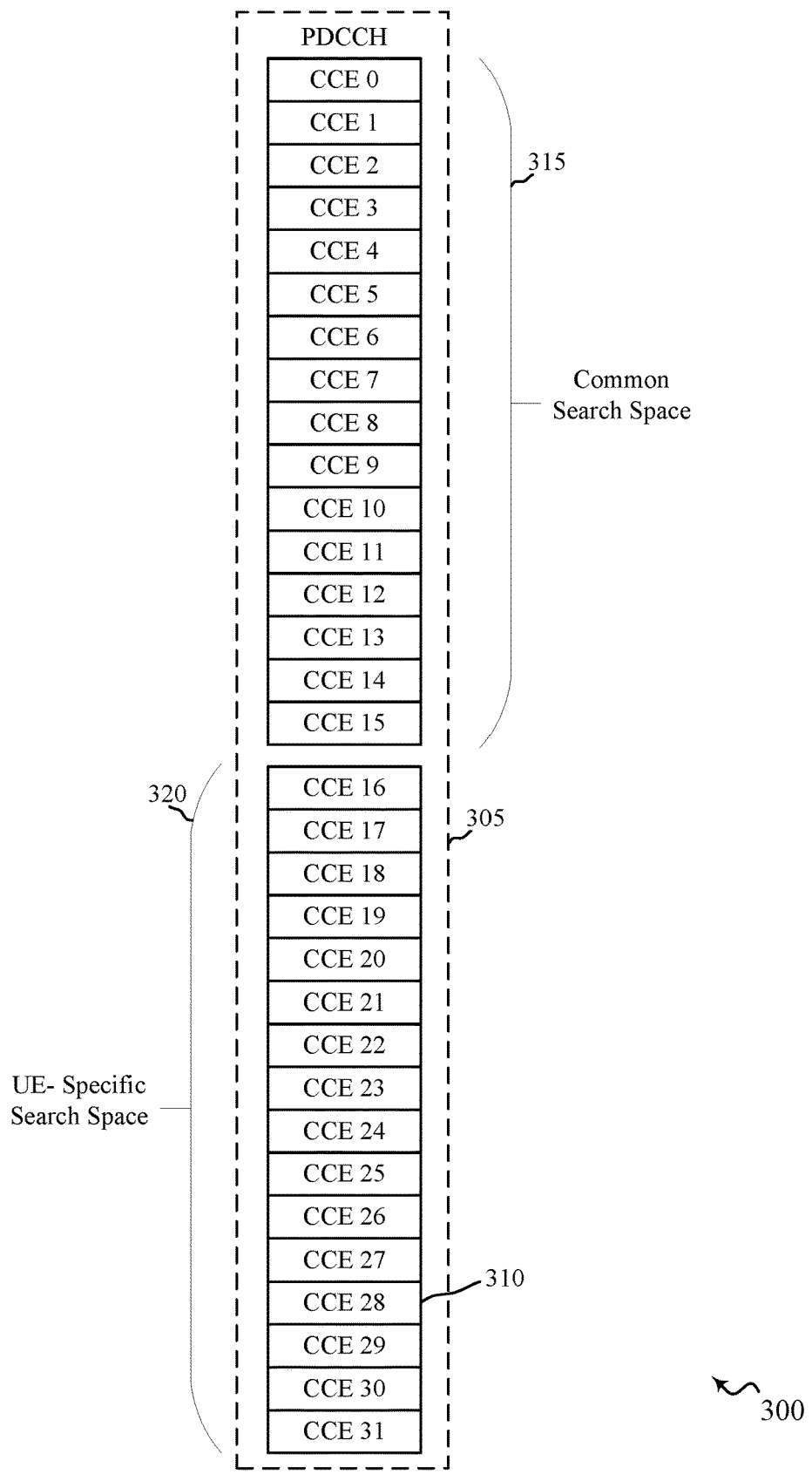
FIG. 3 illustrates an example diagram of a search space that supports efficient blind decoding of a search space in accordance with aspects of the present disclosure.

FIG. 3 illustrates an example search space 300 of a PDCCH 305 for efficient blind decoding of a search space. The search space 300 may be divided into a common search space 315 and a UE-specific search space 320. For simplicity, the search space 300 is depicted as a collection of 32 logically contiguous CCE blocks 310 that are numbered consecutively. Search space 300 may include a different number of CCEs than shown. Each CCE block 310 may contain a fixed number of resource elements in non-contiguous locations. For example, each CCE block 310 may be a set of nine contiguous resource element groups and each resource element group may include four resource elements, such that each CCE block 310 may comprise 36 resource elements. Alternatively or additionally, the CCE blocks 310 may be arranged in non-contiguous locations within the resource blocks of one or more downlink control channels. The common search space may start at CCE 0, while the UE specific search space may start at CCE 16. In some examples, the common search space 315 and the UE-specific search space 320 may span overlapping CCEs. Each search space may be composed of multiple decoding candidates that the UE 115 may monitor for the DCI message. Each decoding candidate may correspond to a particular CCE or group of CCEs within the search space.

In a conventional blind decode, the UE 115 knows that the DCI message is possibly one of multiple lengths (and thus possibly corresponds to multiple numbers of CCEs), and at each decoding candidate location the UE 115 attempts to decode each of the candidate lengths. Thus, at a given decoding candidate location within the search space, the UE 115 generates a first decoding output by descrambling and decoding a number of CCEs corresponding to a first possible aggregation level (e.g., for aggregation level 2, the UE 115 may generate a first decoding output based on CCE 16 and CCE 17). At the same decoding candidate location, the UE 115 also generates a second decoding output by descrambling and decoding a second number of CCEs corresponding to the second possible aggregation level (e.g., for aggregation level 4, the UE 115 may generate a second decoding output based on CCE 16, CCE 17, CCE 18, and CCE 19). The UE 115 then performs separate error detection operations on the first and second outputs to determine if either passes. Because conventional solutions require a UE 115 to operate a decoder (e.g., tail-biting convolutional decoder) multiple times at each location of a decoding candidate, they cause latency and excess power consumption.

To overcome deficiencies in conventional solutions, the examples described herein split a DCI message, which corresponds to a single DCI format, into subparts called element DCIs (eDCIs) that are each independently encoded and decodable. Bits of each eDCI may be mapped to one or more CCEs in a search space, and the eDCIs may have an explicit or implicit linking such that the UE 115 can identify and combine associated eDCIs to recover the DCI message. Different numbers of eDCIs are possible, and this different DCI lengths, including individual DCI formats having variable lengths, are supported. A UE 115 may independently decode each eDCI regardless of DCI message length. Beneficially, redundant decoding of a same eDCI that is included in two or more decoding candidates within a search space is eliminated. A UE 115 searching for multiple DCIs with different lengths (or even of unknown length) may reuse a decoding output for a particular eDCI when attempting to find a DCI of another length. Moreover, linking eDCIs provides a base station with greater flexibility in selecting a length of DCI message to use. For example, the base station 105 may dynamically increase or decrease the length of a DCI message—e.g., to include additional information only on an as-needed basis—and link additional or fewer eDCIs as necessary to accommodate a given message length. Thus, techniques described herein may reduce a number of blind decoding attempts performed by a UE 115, thus reducing reduce latency and power consumption, and may also improve scheduling flexibility for a base station 105.

Figure 4:
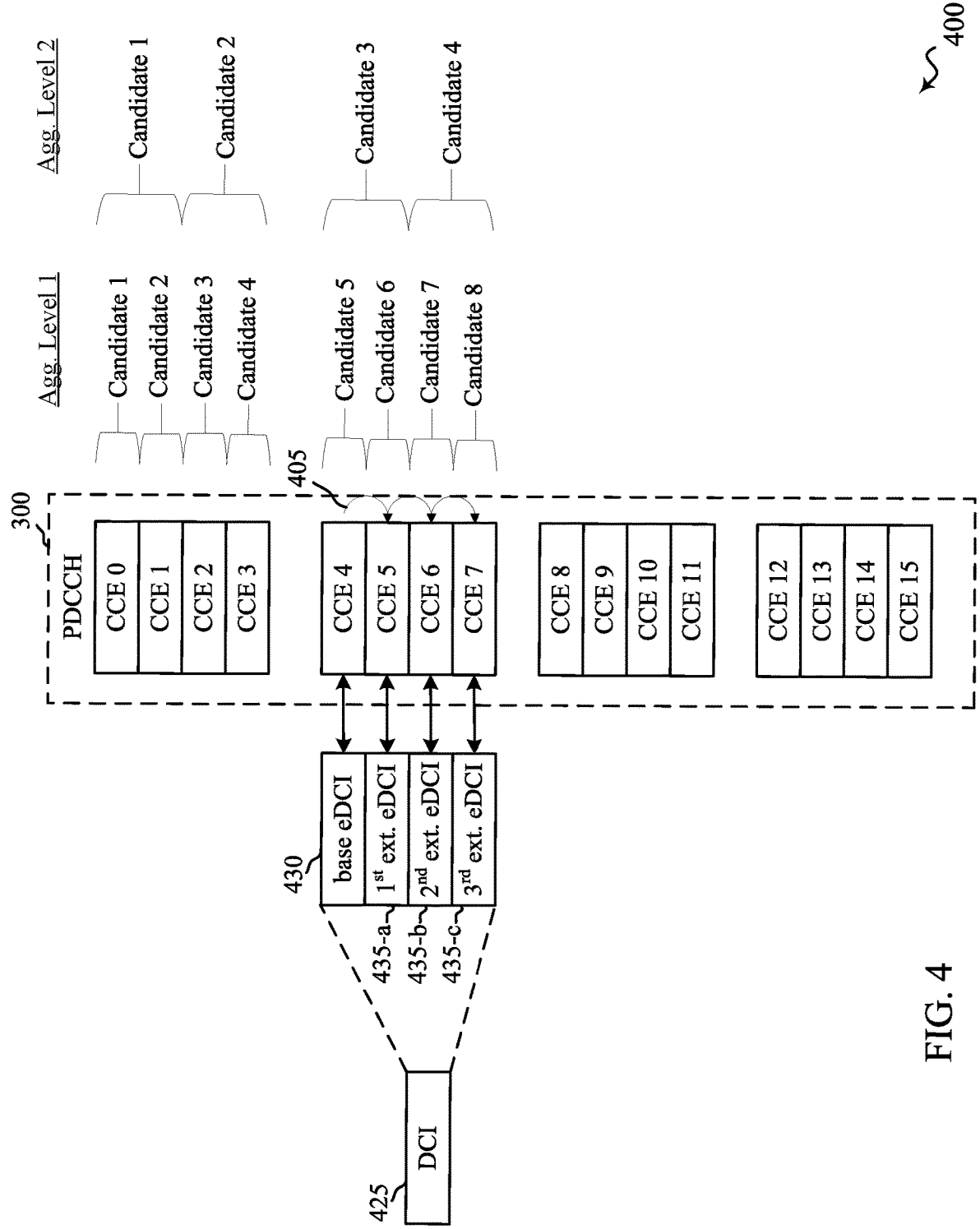
FIG. 4 illustrates an example diagram of parsing a DCI message into eDCIs that are mapped to CCEs in a way that supports efficient blind decoding of a search space in accordance with aspects of the present disclosure.

FIG. 4 illustrates an example diagram 400 of parsing a DCI into eDCIs that are mapped to CCEs for efficient blind decoding of a search space. In an example, a base station 105 may split a DCI message 425 into one or more eDCIs. DCI message 425 may be single message having a single DCI format. Each eDCI may be of a same fixed length, which may be predetermined and known to a UE 115, or may be signaled to UE 115. The base station 105 may independently encode each eDCI so that each eDCI can be independently decoded by the UE 115, even if information obtained by decoding one eDCI may not be useful to the UE 115 other than in conjunction with information obtainable by decoding one or more other linked eDCIs. As depicted, DCI message 425 has been split into a base eDCI 430 and three extended eDCIs 435-a, 435-b, and 435-c. While three extended eDCIs are shown, zero or more extended eDCIs may be used.

To enable decoding by the UE 115, the eDCIs of the DCI message 425 may be mapped to a same aggregation level and a set of decoding candidates may be defined within a search space. Base station 105 may, for example, transmit configuration data to the UE 115 specifying a set of decoding candidates within the search space 300 of a control channel, an aggregation level indicating a number of control channel elements for each of the base eDCI and the extended eDCI, or both. Base eDCI 430 and extended eDCIs 435 may be mapped to contiguous or non-contiguous CCEs within a particular aggregation level. The aggregation level may depend on a bit length of the eDCI and the CCE, and may indicate a number of CCEs per eDCI. For example, an aggregation level of 1 indicates 1 CCE per eDCI, an aggregation level of 2 indicates 2 CCEs per eDCI, an aggregation level of 3 indicates 3 CCEs per eDCI, and so forth. As in one of the depicted examples, wherein the aggregation level is 1, each of base eDCI 430 and extended eDCIs 435-a, 435-b, and 435-c is respectively mapped to CCE 5 to CCE 8 of the search space 300. In the other depicted example, wherein the aggregation level is 2, each eDCI is mapped to multiple CCEs (e.g., base eDCI 430 is mapped to CCE 4 and CCE 5). The length of base eDCI 430 and extended eDCIs 435 may be the same for multiple DCI formats. For example, the length of base eDCI 430 may be the same for multiple (e.g., up to all) DCI formats for each aggregation level. That is, the UE 115 may only perform a number of blind decodes for the base eDCI corresponding to the different configured aggregation levels, with detection of the DCI format for a given aggregation level being based on a format indicator in the DCI.

The base eDCI 430 and extended eDCIs 435 for a single DCI message 425 may be linked (see 405) to enable the UE 115-a to identify related eDCIs that may be combined to recover the DCI message 425. The linking may be implicit or explicit, and may be from base eDCI 430 to one or more of extended eDCIs 435-a, 435-b, and 435-c; additionally or alternatively, the linking may be from one extended eDCI 435 to base eDCI 430 or another of the extended eDCIs 435. Explicit linking may be bidirectional, and if a first eDCI links to a second eDCI, the second eDCI may link back to the first eDCI and thus provide a double-check. When the base station 105 utilizes implicit linking, the base station 105 may inform the UE 115 of a pattern (or the UE 115 may be configured with the pattern a priori) according to which extended eDCIs 435 may be found in a search space 300 relative to a CCE that includes bits of the base eDCI 430. For example, the pattern may be that the extended eDCIs 435 are in CCEs that consecutively follow the CCE including the bits of the base eDCI 430 in the search space 300. For example, the aggregation level 1 example of FIG. 4 depicts base eDCI 430 being mapped to CCE 4, and extended eDCI 435-a is mapped to CCE 5, which is the CCE that immediately follows CCE 4 in the search space. Likewise, extended eDCI 435-*b* is mapped to CCE 6, which is the CCE that immediately follows CCE 5 in the search space, and extended eDCI 435-*c* is mapped to CCE 7. In another example, CCEs containing eDCIs corresponding to a single DCI message 425, which may be referred to as associated eDCIs, are serially linked by offsetting the associated eDCIs within the search space by the same number of CCEs. For example, base eDCI 430 is mapped to CCE 4, extended eDCI 435-*a* is mapped to CCE 6 (e.g., location of base eDCI within the search space plus two CCEs), extended eDCI 435-*b* is mapped to CCE 8 (e.g., location of previous extended eDCI within the search space 300 plus two CCEs), and so forth. In another example, the pattern may be specific locations for extended eDCIs 435 when the base eDCI 430 is mapped to a particular CCE in the search space 300. For example, if a base eDCI 430 is mapped to CCE 1, the pattern may be that associated extended eDCIs 435 are found at CCE 7, CCE 12, and CCE 15, and if a base eDCI 430 is mapped to CCE 2, the pattern may be that associated extended eDCIs 435 are found at CCE 6, CCE 13, and CCE 14.

When the base station 105 utilizes explicit linking, the base eDCI 430, an extended eDCI 435, or both may provide information indicating where other associated eDCIs of DCI message 425 are located within the search space 300. In an example, the base eDCI 430 may identify a CCE location in the search space 300 for a next one of the extended eDCIs 435 (e.g., CCE location of extended eDCI 435-*a*). In another example, the base eDCI 430 may identify a CCE location in the search space for a next one of the extended eDCIs 435 (e.g., extended eDCI 435-*a*) and a total number of CCEs in the search space 300 that include extended eDCIs 435 (e.g., there are 3 extended eDCIs associated with base eDCI 430). In a further example, the base eDCI 430 may indicate CCE locations in the search space of two or more of the extended eDCIs 435 (e.g., CCE locations for extended eDCIs 435-*a*, 435-*b*, 435-*c*). It is noted that the locations described herein may be a specific location within the search space 300 or a location within the search space 300 relative to a location of one of the eDCIs. In one example, the base eDCI 430 may indicate that extended eDCI 435-*a* is located at CCE5. In another example, the base eDCI 430 may indicate that extended eDCI 435-*a* is offset by one or more CCEs from the location of the base eDCI 430 within the search space. In yet another example, an eDCI (either a base eDCI 430 or an extended eDCI 435) may link to a prior associated eDCI. For example, extended eDCI 435-*b* may include an explicit link identifying the CCE location of the base eDCI 430 or extended eDCI 435-*a* in the search space. Linking back to a prior associated eDCI may serve as a cross-check by which UE 115 may make sure that two eDCIs each point to one another.

The independent encoding and linkage may result in improved efficiency during blind decodes of the search space 300. In an example, the UE 115 may be configured to monitor for two different candidate lengths of the DCI message 425: a candidate length of two eDCIs and a candidate length of four eDCIs. Within the search space 300, a first possible DCI transmission is thus DCI message 425 being split into base eDCI 430 and a single extended eDCI 435-*a*. And a second possible DCI transmission is DCI message 425 being split into base eDCI 430 and extended eDCIs 435-*a*, 435-*b*, and 435-*c*. If DCI message 425 is composed of four eDCIs, the UE 115 may independently decode each of CCE 4 to CCE 7 to recover eDCIs 430, 435-*a*, 435-*b*, and 435-*c* and recover the DCI message 425 by combining eDCIs 430, 435-*a*, 435-*b*, and 435-*c*. If DCI message 425 is composed of two eDCIs, the UE 115 will recover it by decoding and combining eDCI 430 and 435-*a*. For both DCI transmission length possibilities, UE 115 decodes base eDCI 430 and eDCI 435-*a*. Thus, the UE 115 may reuse the decoding results for eDCI 430 and eDCI 435-*a* when checking the second candidate length of the DCI message 425, and may thus avoid decoding each of eDCI 430 and eDCI 435-*a* twice, once for each candidate length.

Further, using one or more fixed-sized eDCIs to transmit a single DCI message 425 corresponding to a single DCI format may increase flexibility in scheduling and in DCI message/format size. For example, a base station 105 may want to include information in a DCI message 425 beyond a default amount of information for a given DCI format, but only on an as-needed basis. Base station 105 may dynamically increase or decrease the amount of information included in a DCI message 425 of a given DCI format and accommodate the changing message size by increasing or decreasing a number of extended eDCIs 435 associated with the base eDCI 430. Further, linking associated eDCIs are linked and encoding each eDCI such that it is individually decodable and of a same fixed size may allow UE 115 to identify and combine all associated eDCIs regardless of the number of eDCIs into which the DCI message 425 is split. Thus, dynamic-length DCI formats are possible in which a number of fixed-size eDCIs used to transmit a DCI message 425 is dynamically varied by base station 105. Dynamic-length DCI formats may be used, for example, for code block or code block group level ACK/NACK information, where the number of ACK/NACK bits depends on the size (e.g., number of code blocks or code block groups) of the uplink transmission corresponding to the DCI.

Figure 5:
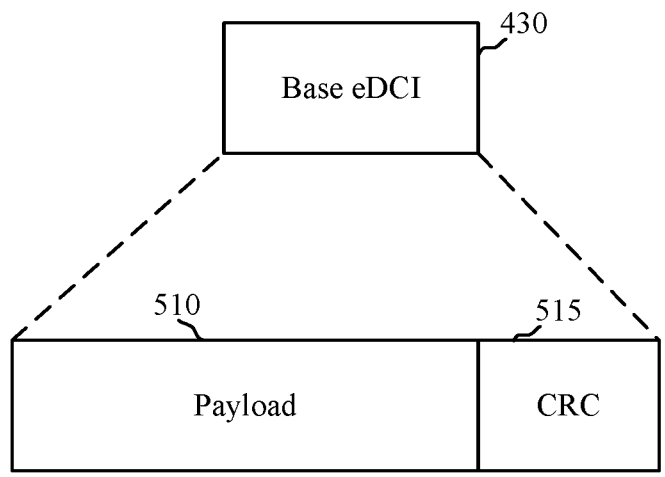
FIG. 5 illustrates an example diagram of a base eDCI that supports efficient blind decoding of a search space in accordance with aspects of the present disclosure.
Figure 5:

A base eDCI 430 may be formatted to include a payload and an error detecting code. FIG. 5 illustrates an example diagram 500 of a base eDCI that supports efficient blind decoding of a search space. The base eDCI 430 may include a base payload 510 and an error detecting code 515. The base payload 510 may include information regarding downlink scheduling assignments, uplink resource grants, transmission scheme, uplink power control, hybrid automatic return repeat request (HARD) information, modulation and coding schemes (MCS), location of extended eDCI(s), and other information. For example, base payload 510 may include explicit linking information regarding one or more associated extended eDCIs. The error detecting code 515 may be information for determining whether the base payload 510 was correctly received and addressed to a particular UE 115. In an example, the error detecting code 515 may be a cyclic redundancy check (CRC). The base station 105 may apply an error detection algorithm to the base payload 510 to generate the error detecting code 515. The UE 115 may receive the base eDCI 430, parse the base payload 510 and the error detecting code 515, and apply the same error detection algorithm to the base payload 510 to generate a calculated error detecting code. If the received error detecting code 515 matches the calculated error detecting code, the UE 115 may determine that the base payload 510 was correctly received. In one example, the base eDCI 430 may have a length of 46 bits, with 30 of the bits used for the base payload 510 and 16 bits used for the base error detecting code (e.g., a CRC) 515.

As search space 300 may include multiple base eDCIs intended for different UEs, each base eDCI 430 may include information to enable a particular UE to determine whether a particular base eDCI is addressed to that UE. To do so, the base station 105 may generate a base eDCI and scramble the base eDCI with a radio network identifier prior to transmission. The radio network identifier may be information to identify to which UE or group of UEs the base eDCI is addressed. In an example, the radio network identifier may be a Cell Radio Network Temporary Identifier (C-RNTI) that is assigned to the UE 115 by its serving base station 105. The base station 105 may scramble the base eDCI with the C-RNTI of UE 115 when the base eDCI is addressed to the UE 115. In another example, the radio network identifier may be a group Radio Network Temporary Identifier (group RNTI) that is assigned to a group of UEs by a serving base station 105. The base station 105 may scramble the base eDCI with the group RNTI of UE 115 when the base eDCI is addressed to the group of UEs. As another example, the base station may scramble only error detecting code 515 with a C-RNTI or group RNTI.

An extended eDCI 435 may be formatted to include a payload and may also include its own error detecting code. An extended eDCI 435 may have the same number of bits, and the a same fixed length, as the base eDCI 430, but may have different numbers of bits allocated to an extended payload and to an error detecting code as compared to base payload 510 and base error detecting code 515. For example, an extended eDCI 435 may have a greater portion of its bits allocated to a payload and a lesser allocation to an error detecting code. In some cases, an extended eDCI 435 may not include any error detecting code. For example, if an extended eDCI 435 does not include its own error detecting code, multiple extended eDCIs 435 may share an error detecting code.

Figure 6:
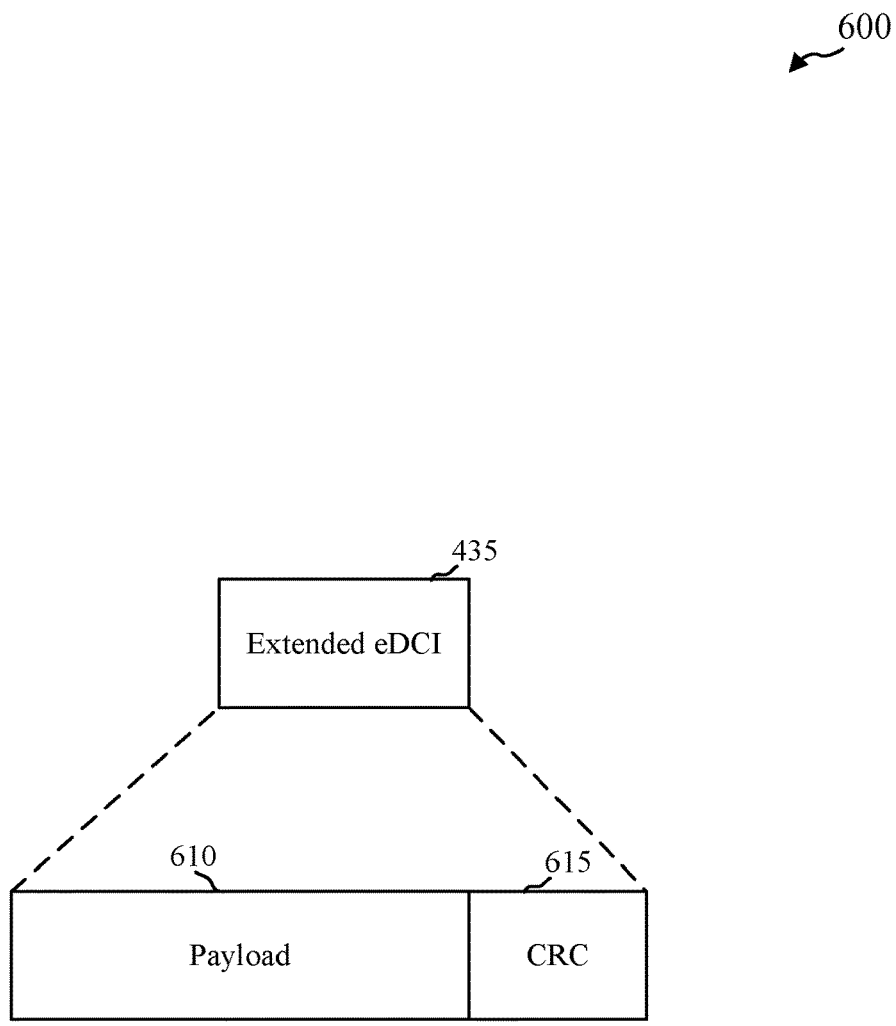
FIG. 6 illustrates an example diagram of an extended eDCI that supports efficient blind decoding of a search space in accordance with aspects of the present disclosure.

FIG. 6 illustrates an example diagram 600 of an extended eDCI 435 that supports efficient blind decoding of a search space. The extended eDCI 435 may include an extended payload 610 and an error detecting code 615. The extended payload 610 may include information regarding downlink scheduling assignments, uplink resource grants, transmission scheme, uplink power control, hybrid automatic return repeat request (HARD) information, modulation and coding schemes (MCS), location of associated base and/or extended eDCI(s), and other information. For example, extended payload 610 may include explicit linking information regarding an associated base eDCI 430 or one or more associated extended eDCIs 435. The error detecting code 615 may include information for determining whether the extended payload 610 was correctly received, as well as information regarding whether the extended eDCI 435 is intended for a UE 115, and the UE 115 may determine whether the extended eDCI 435 was correctly received and whether it was intended for the UE 115 in the same manner described above in which it determined whether the base eDCI 430 was correctly received and intended for the UE 115.

In some examples, the base station 105 may skip scrambling of the extended eDCIs 435, or error detecting codes 615 for extended eDCIs 435, due to the linking between associated eDCIs. Because each of the eDCIs are linked, scrambling the base eDCI 430 may be sufficient to indicate to the UE 115 whether extended eDCIs 435 associated with the base eDCI 430 are addressed to that UE 115. In other examples, some or all of the extended eDCIs 435 may include an error detecting code 615 but not an extended payload 610 that has been scrambled with a radio network identifier.

The length of the error detecting code 615 for an extended eDCI 435 may differ from the length of the error detecting code 515 for a base eDCI 430. For example, the length of the error detecting code 615 may be shorter than the length of the error detecting code 515. The shortened length may permit the extended eDCI 435 to carry more bits in extended payload 610 (relative to the number of bits in a base payload 510) at the expense of having less robust error detection or false alarm rate performance because the false alarm rate for the extended eDCI 435 is effectively protected by the CRC of the base eDCI 430.

Figure 7:
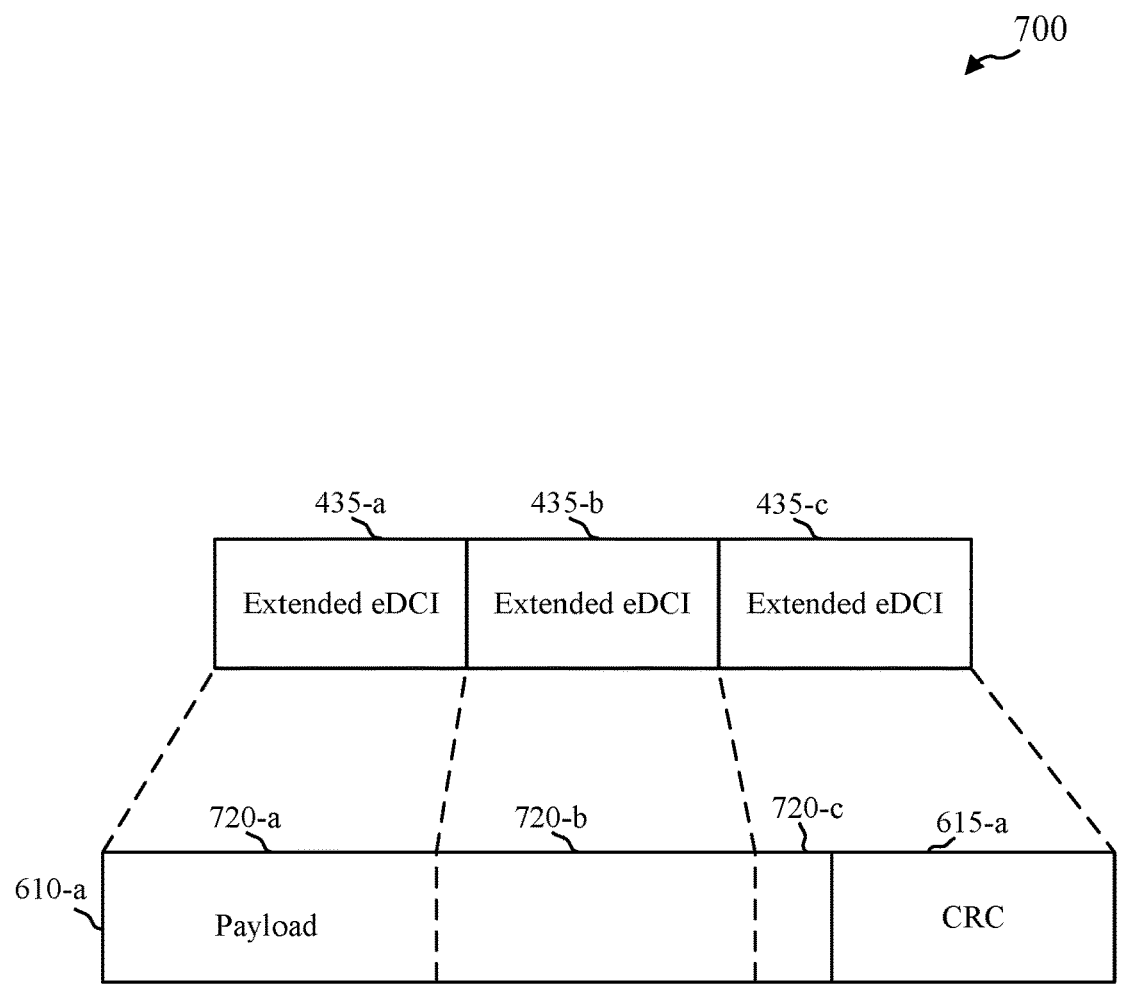
FIG. 7 illustrates an example diagram of an extended eDCI that supports efficient blind decoding of a search space in accordance with aspects of the present disclosure.

Not all extended eDCIs 435 may include their own error detecting code and, in some examples, multiple extended eDCIs 435 may share a single error detecting code. FIG. 7 illustrates an example diagram 700 of multiple extended eDCIs 435 that share a single error detecting code 615 in a manner that supports efficient blind decoding of a search space. Depicted are three extended eDCIs 435-*a*, 435-*b*, and 435-*c* that collectively include one extended payload 610-*a* and one shared error detecting code 615-*a*. Extended eDCI 435-*a* may include a first portion 720-*a* of extended payload 610-*a*, and extended eDCI 435-*b* may include a second portion 720-*b* of extended payload 610-*a*. Extended eDCI 435-*c* may include a third portion 720-*c* of extended payload 610-*a* along with the shared error detecting code 615-*a*.

The base station 105 may generate the shared error detecting code 615-*a* by applying an error detection algorithm to the entirety of the extended payload 610-*a*. The base station 105 may split the extended payload 610-*a* into the first, second, and third portions 720 based at least in part on the fixed number of bits included in each extended eDCI 435. The base station 105 may include the shared error detecting code 615-*a* in a single or multiple ones of the extended eDCIs 435. In diagram 700, the shared error detecting code 615-*a* is included only in extended eDCI 435-*c*, but the shared error detecting code 615-*a* may in other examples be placed in other ones of the extended eDCIs 435 or may be split across multiple extended eDCIs 435. The UE 115 may determine whether the entirety of the extended payload 610 was correctly received and intended for the UE 115 using the shared error detecting code 615-*a* in the same manner described above in which it determined whether the base eDCI 430 was correctly received and intended for the UE 115.

Figure 8:
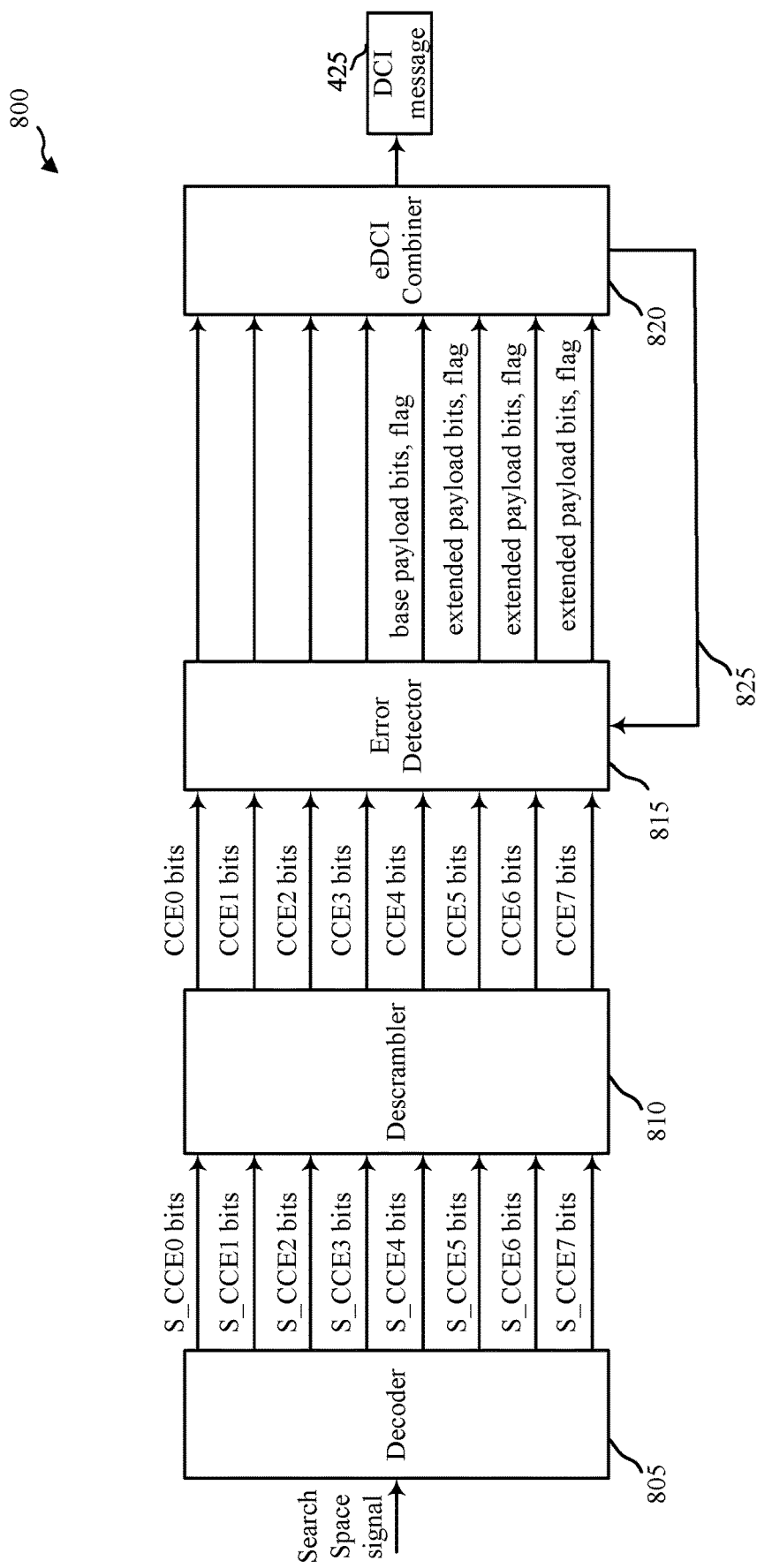
FIG. 8 illustrates an example diagram of device components that support efficient blind decoding of a search space in accordance with aspects of the present disclosure.

The UE 115 may use the eDCIs to efficiently perform a blind decode of the search space. FIG. 8 illustrates an example of a diagram 800 for efficient blind decoding of a search space. The UE 115 may include a decoder 805, a descrambler 810, an error detector 815, and an eDCI combiner 820. The UE 115 may receive a signal (e.g., a wireless signal) transmitted by the base station 105 that includes the search space(s) 300. The signal may comprise a control channel, such as a PDCCH, that includes the search space(s) 300. The base station 105 may also inform the UE 115 of a set of decoding candidates within the search space(s) 300. A decoder 805 may process and decode CCEs from the received signal corresponding to the locations of the set of decoding candidates within the search space(s) 300. In this example, the UE 115 may be performing a blind decode of the search space on aggregation level 1 candidates and aggregation level 2 candidates corresponding to the depiction shown in FIG. 4. In this example, the decoder 805 may decode CCEs 0 to 7 in parallel and output a set of decoding outputs, where each decoding output includes bits decoded corresponding to one of the CCEs. Serial decoding may also be used. The decoder 805 may output bits corresponding to CCE 0 to CCE 7 to the descrambler 810. Here, all bits of the eDCIs mapped to CCE 0 to CCE 7 were scrambled prior to transmission by the base station 105, as represented by the notation S_CCE, where S_CCE0 represents the decoded but not yet descrambled bits of CCE 0 received as part of the search space. In other examples, only the base eDCIs may have been scrambled and the extended eDCIs may not have been scrambled, or only error detecting codes may have been scrambled.

The descrambler 810 may independently descramble the scrambled bits of each of CCE 0 to CCE 7 using a radio network identifier (e.g., C-RNTI of UE 115). Descrambling may be used to identify the set of decoding outputs corresponding to a radio network identifier associated with the UE 115 or associated with a UE group that includes the UE 115 when searching for a base eDCI 430. In some examples, only selected CCEs of the decoding candidates may include a base eDCI, and hence descrambler 810 may descramble only bits of the selected CCEs. If a particular CCE was not scrambled by the base station 105, and thus the CCE arrives unscrambled, descrambler 810 may pass through its unscrambled bits without descrambling. In FIG. 8, the notation CCE0 represents the decoded and, as applicable, descrambled or unscrambled bits of CCE 0 of search space 300. In some examples, the descrambler 810 may pass both descrambled bits and unscrambled bits to the error detector 815. Unscrambled bits may, for example, be bits of an extended eDCI 435 that were not scrambled before transmission, and the UE 115 may still perform error detection on the unscrambled bits of the extended eDCI if the extended eDCI is linked to a base eDCI addressed to the UE 115.

The error detector 815 may utilize an error detecting algorithm to perform error detection on decoded and, as applicable, descrambled or unscrambled bits of one or more CCEs. In some instances, the UE 115 may be unaware of which CCE includes bits of the base eDCI 430. The error detector 815 may know, however, the format of the base eDCI 430 (see FIG. 5) and may use that information to parse the base payload 510 from the error detecting code 515 based at least in part on the number of bits in each. For example, the base eDCI 430 may include 46 bits, with the base payload 510 being the first 30 bits and the error detecting code 515 being the last 16 bits. The error detector 815 may parse the base payload 510 and the error detecting code 515 from the base eDCI 430. The error detector 815 may then apply the same error detection algorithm to the base payload 510 as applied by the base station 105 to generate a calculated error detecting code. If the received error detecting code 515 matches the calculated error detecting code, the UE 115 may determine that the base payload 510 was correctly received. Passing the error detecting algorithm, following descrambling with a radio network identifier associated with the UE 115 or a UE group that includes the UE 115, may indicate that the base eDCI 430 is addressed to the UE 115.

In some cases, if the decoded bits of a CCE fail the error detecting algorithm, error detector 815 may determine that the bits of that CCE are not bits of a base eDCI 430 addressed to the UE 115. Error detector 815 may not discard those bits, however, as they may be bits of an extended eDCI 435 corresponding to a base eDCI 430 addressed to the UE 115. In the example of diagram 800, the error detector 815 may determine that the bits of CCE 4 passed the error detecting algorithm, and that the bits of CCE 0 to CCE 3 and CCE 5 to CCE 7 failed the error detecting algorithm. The error detector 815 may feed the bits of CCE 4 to the eDCI combiner 820 along with a flag. The flag may indicate whether the bits passed error detection and a type of eDCI for the bits (e.g., base eDCI 430 or extended eDCI 435).

The eDCI combiner 820 may process the bits of CCE 4 and identify a link between the corresponding base eDCI 430 and one or more associated extended eDCIs 435. If the link is explicit, the base eDCI 430 may indicate at least a CCE location within the search space 300 of one of more associated extended eDCIs 435. For example and with reference to diagram 800, base eDCI 430, which is at CCE 4, may indicate that a next extended eDCI is at CCE 5 within search space 300. In another example, the link between the base eDCI 430 and one or more extended eDCIs 435 may be implicit. For example, it may be implicit and thus understood by eDCI combiner 820 that the next extended eDCI is at a consecutive location CCE location in the search space 300 (e.g., at CCE 5). Regardless of the type of linking used, the eDCI combiner 820 may identify which CCEs within the search space 300 include one or more extended eDCIs 435 corresponding to the base eDCI 430. The eDCI combiner 820 may request via feedback loop 825 that the error detector 815 perform the error detecting algorithm on the CCE bits corresponding to the one or more extended eDCIs 435. For example, eDCI combiner 820 may process base eDCI 430 at CCE 4 and determine that extended eDCIs 435-*a*, 435-*b*, and 435-*c* have respectively been mapped to CCE 5 to CCE 7 and are associated with the base eDCI 430. The eDCI combiner 820 may then request that the error detector 815 perform the error detecting algorithm on the bits of CCE 5 to CCE 7.

The error detector 815 may then perform the error detecting algorithm on the bits of the one or more CCEs identified by eDCI combiner 820. In some instances, the error detector 815 may know the format of the extended eDCI and may use that information to parse the extended payload 610 from the error detecting code 615 (see FIG. 6) based at least in part on the number of bits in each. For example, the extended eDCI 435 may include 46 bits, with the extended payload 610 being the first 36 bits and the error detecting code 615 being the last 10 bits. If the received error detecting code 615 matches the calculated error detecting code, the error detector 815 may determine that the extended payload 610 was correctly received. The error detector 815 may then feed the bits of the CCE along with a flag to the eDCI combiner 820. The flag may indicate the type of the eDCI and whether the bits passed the error detecting algorithm.

If the bits of an extended eDCI 435 fail the error detecting algorithm when treated as an extended eDCI 435 having its own error detecting code 615, error detector 815 may not discard those bits, however, as they may be bits of an extended payload 610-*a* having a shared error detecting code 615-*a* (see FIG. 7). The error detector 815 may know the bit length of the shared error detecting code 615-*a*, concatenate bits of two or more associated extended eDCIs 435, and parse the concatenated bits to retrieve an extended payload 610-*a* and a shared error detecting code 615-*a*. For example, the error detector 815 may know that a shared error detecting code 615-*a* is 10 bits in length, and may parse the concatenated extended eDCIs 435 to process the final 10 bits as a shared error detecting code 615-*a*. The error detector 815 may perform the error detecting algorithm on the remaining bits, which comprise the extended payload 610-*a*, to generate a calculated shared error detecting code for comparison to the received shared error detecting code 615-*a*. If the received shared error detecting code 615-*a* matches the calculated shared error detecting code, the error detector 815 may determine that the extended payload 610-*a* was correctly received. The error detector 815 may then feed the bits of the extended payload 610-*a* along with a flag to the eDCI combiner 820. The flag may indicate the type of the eDCI and whether the bits of the extended payload 610-*a* passed the error detecting algorithm. If the received shared error detecting code 615-*a* does not match the calculated shared error detecting code, the error detector 815 may indicate that an error has been detected for bits of the corresponding CCE(s).

Once the error detector 815 has finished processing the bits of the CCEs, and the one or more flags that indicate whether the bits therein passed error detection, the eDCI combiner 820 may concatenate the base payload 510 with one or more extended payloads 610 output by the error detector 815. The eDCI combiner 820 may compare the concatenated bits to an expected length of a DCI message. If a match is found, the eDCI combiner 820 may output the DCI message 425 and the UE 115 may communicate based at least in part on the DCI message 425.

In some examples, the UE 115 may be unaware of the exact number of extended eDCIs 435 that are associated with the base eDCI 430. This may occur, for example, when implicit linking between eDCIs is used. In such a scenario, the UE 115 may utilize the known set of possible lengths for a DCI message 425. The error detector 815 and the eDCI combiner 820 may proceed along the implicit linking until the CCE bits for one of the extended eDCIs fails to pass the error detecting algorithm. The eDCI combiner 820 may then concatenate the bits of the base payload 510 and the bits of the one or more extended payloads 610 that passed error detection and compare a length of the concatenated bits to the set of possible lengths for a DCI message 425. If the length of the concatenated bits matches a length within the set of possible lengths for a DCI message 425, the eDCI combiner 820 may determine that a DCI message 425 has been found and outputs the DCI message for interpretation by the UE 115. If the length of the concatenated bits does not match a length within the set of possible lengths for a DCI message 425, the eDCI combiner 820 may determine that a DCI message 425 has not been found and output an error message. The UE 115 may thus in some examples determine whether a complete DCI message 425 has been found based at least in part on a payload of a candidate extended eDCI within the set of decoding outputs failing an error detecting algorithm.

Beneficially, multiple lengths of a single DCI message 425, having a single DCI format, are supported while duplicative decoding of the same eDCI is avoided, as a single eDCI decoding result may be reused for blind decodes of candidate DCI messages 425 having different lengths that include the single eDCI. For instance, decoder 805 may decode an eDCI that is common to different candidate DCI messages at the same aggregation level. For example, in FIG. 4, DCI messages 425 of one, two, three, four, or more CCEs may be generated for aggregation level 1. Because each eDCI may be independently decoded, fewer overall aggregation levels may be used. For example, where DCI message lengths of 1 CCE to 8 CCEs may be desired, two aggregation levels (1 CCE and 2 CCEs) may be used with varying numbers of extended eDCIs per CCE, instead of four aggregation levels (1 CCE, 2 CCEs, 4 CCEs, 8 CCEs) wherein a full DCI message is decoded as one candidate DCI. Thus, a number of blind decodes may be reduced by at least a factor of two using independently decodable base eDCIs 430 and extended eDCIs 435.

Figure 9:
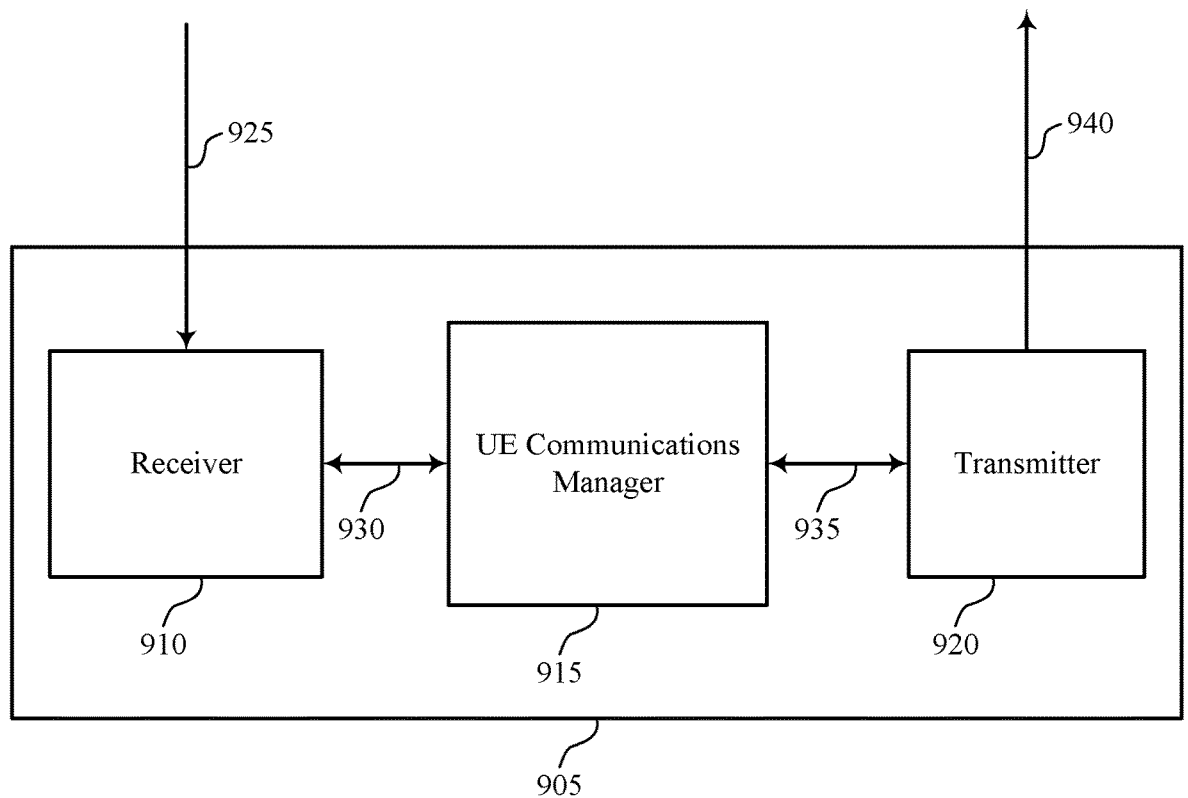
FIGS. 9 through 10 show block diagrams of a device that supports efficient blind decoding of a search space in accordance with aspects of the present disclosure.

FIG. 9 shows a block diagram 900 of a wireless device 905 that supports efficient blind decoding of a search space in accordance with various aspects of the present disclosure. Wireless device 905 may be an example of aspects of a user equipment (UE) 115 as described with reference to FIG. 1. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to efficient blind decoding of a search space, etc.). For example, receiver 910 may receive may receive via communication link 925 a signal (e.g., a wireless signal) transmitted by the base station 105 that includes the search space(s) 300. The signal may comprise a control channel, such as a PDCCH, that includes the search space(s) 300. Receiver 910 may also receive information regarding a set of decoding candidates within the search space(s) 300. Receiver 910 may send the search space(s) 300 and related information to other components of the device, such as UE communications manager 915, via communication link 930 or other communication links. The receiver 910 may be an example of aspects of the transceiver 1135 described with reference to FIG. 11.

UE communications manager 915 may be an example of aspects of the UE communications manager 1115 described with reference to FIG. 11.

UE communications manager 915 may monitor a search space of a control channel, such as a search space 300 conveyed by receiver 910, for eDCI information by decoding a set of decoding candidates within the search space to generate a set of decoding outputs, identify, among the set of decoding outputs, a base eDCI 430 corresponding to a radio network identifier associated with the UE, parse the base eDCI 430 to obtain a base payload 510, determine a location of an extended eDCI 435 within the set of decoding outputs based on the base eDCI 430, parse the extended eDCI 435 to obtain an extended payload 610, and communicate based on a DCI message 425 formed by combining the base payload 510 and the extended payload 610.

Transmitter 920 may receive output from UE communications manager 915 via communication link 935 and transmit signals generated by other components of the device via the same or other communication links. For example, transmitter 920 may receive from UE communications manager 915 via communication link 935 data associated with a communication based on the DCI message 425 formed by combining the base payload 510 and the extended payload 610 and communicate that message via one or more communication links, such as wireless communication link 940. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
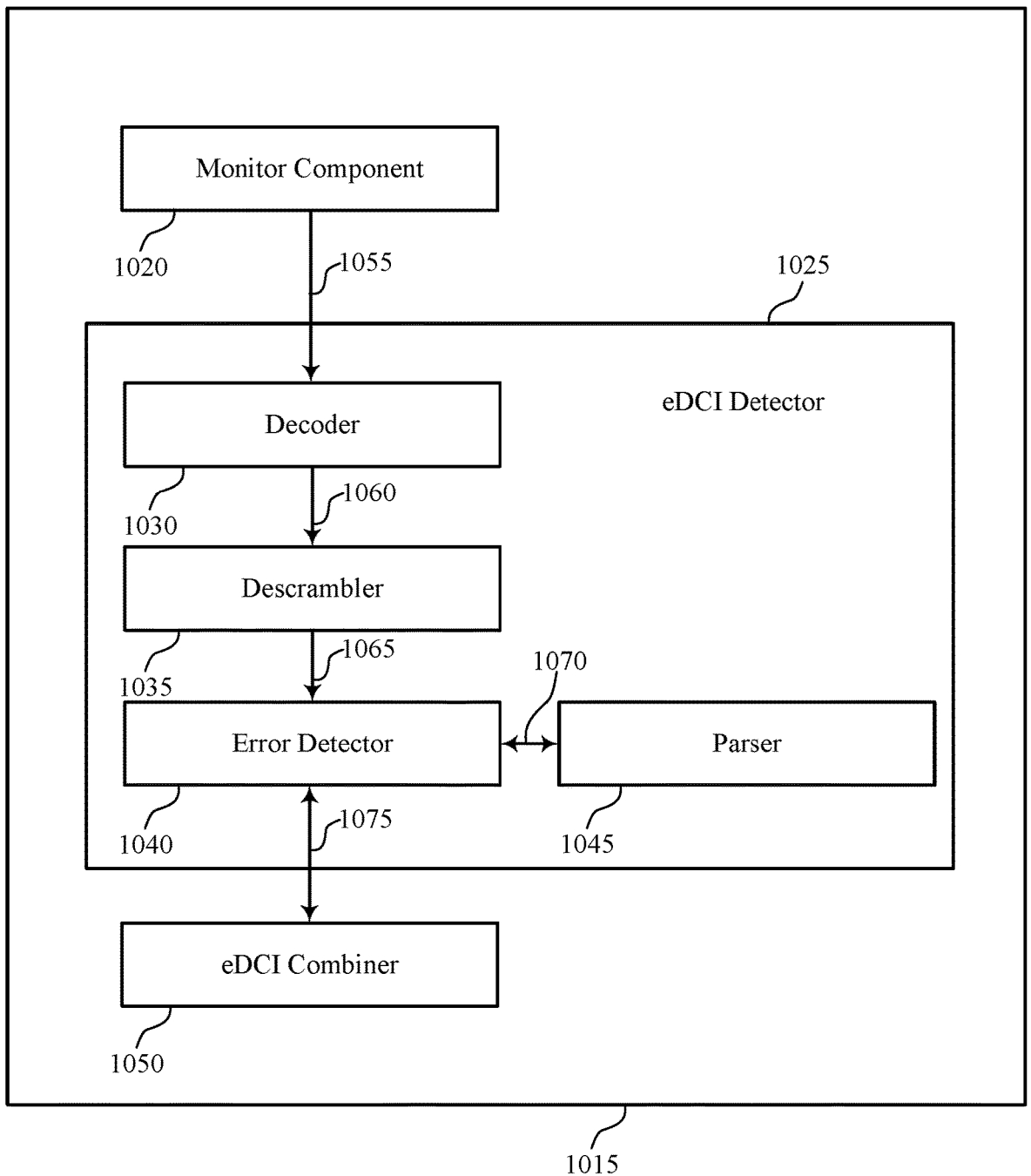

FIG. 10 shows a block diagram 1000 of a UE communications manager 1015 that supports efficient blind decoding of a search space in accordance with various aspects of the present disclosure. The UE communications manager 1015 may be an example of aspects of a UE communications manager 915 or a UE communications manager 1115 described with reference to FIGS. 9 and 11. The UE communications manager 1015 may include monitor component 1020, eDCI detector 1025, decoder 1030, descrambler 1035, error detector 1040, parser 1045, and eDCI combiner 1050. Each of these modules may communicate, directly or indirectly, with one another (e.g., via one or more buses).

Monitor component 1020 may monitor a search space of a control channel for eDCI by identifying decoding candidates within the search space, which may include processing configuration data specifying the set of decoding candidates within the search space or an aggregation level indicating a number of CCEs within the search space for each of the decoding candidates. Monitor component 1020 may communicate with eDCI detector 1025 via a communication link and may convey decoding candidates 1055 and related configuration data to eDCI detector 1025.

eDCI detector 1025 may include decoder 1030, descrambler 1035, error detector 1040, parser 1045. eDCI detector 1025 may, for example, identify, among the set of decoding candidates 1055, a base eDCI 430 corresponding to a radio network identifier associated with the UE 115, determine a location of an extended eDCI 435 within the set of decoding candidates 1055 based on the base eDCI 430, detect that a link in the extended eDCI 435 corresponds to a location of the base eDCI 430 within the search space, determine a location of a second extended eDCI 435 within the set of decoding candidates 1055 based on the extended eDCI 435, and decode at least one other extended eDCI 435. In some cases, the determining the location of an extended eDCI 435 includes determining the location of the extended eDCI 435 within the set of decoding candidates 1055 relative to a location of a base eDCI 430. In some cases, the determining the location of an extended eDCI 435 includes processing a base eDCI 430 to obtain the location of the extended eDCI 435 within the set of decoding candidates 1055.

Decoder 1030 may receive decoding candidates 1055, decode the decoding candidates, and convey decoding outputs 1060 to descrambler 1035.

Descrambler 1035 may descramble decoding outputs 1060 or portions of decoding outputs 1060 received from decoder 1030 and may convey descrambled (or unscrambled) bits 1065 corresponding to the decoding outputs to error detector 1040. For example, descrambler 1035 may descramble CCE bits, including an error detecting code from a base eDCI 430 to generate a descrambled error detecting code, where the descrambled error detecting code corresponds to the base payload. In some cases, descrambler 1035 may use the radio network identifier as part of the descrambling process.

Error detector 1040 may apply an error detecting algorithm to descrambled (or unscrambled) bits 1065 to determine whether decoded and descrambled decoding candidates 1055 comprise a base eDCI 430 or associated extended eDCI 435 that has been properly received and addressed to the UE 115. For example, error detector 1040 may apply an error detection algorithm to a candidate base payload to generate a calculated error detecting code, and may determine a successful decode of a base payload 510 based on the received error detecting code and the calculated error detecting code. As another example, error detector 1040 may apply an error detection algorithm to a candidate extended payload 610 to generate a calculated error detecting code, and may determine a successful decode of the extended payload 610 based on the received error detecting code and the calculated error detecting code. In some examples, error detector 1040 may process an extended eDCI 435 and at least one other extended eDCI 435 to obtain a combined extended payload 610-*a* and a received shared error detecting code 615-*a* corresponding to the combined extended payload 610-*a*, may apply an error detection algorithm to the combined extended payload 610-*a* to generate a calculated error detecting code, and may determine a successful decode of the extended eDCI 435 and the at least one other extended eDCI 435 based on the received error detecting code and the calculated error detecting code.

Error detector 1040 may exchange information with parser 1045 via communication link 1070, with parser 1045 isolating payloads and error detecting codes from eDCIs that error detector 1040 is evaluating to determine whether they comprise a base eDCI 430 or associated extended eDCI 435 that has been properly received and addressed to the UE 115. In some examples, parser 1045 may parse a base eDCI 430 to obtain a base payload 510, parse an extended eDCI 435 to obtain an extended payload 610, parse a second extended eDCI 435 to obtain a second extended payload 610, and process the extended eDCI 435 to obtain a received error detecting code 615-*a* corresponding to the extended payload 610.

Error detector 1040 may also exchange information with eDCI combiner 1050 via communication link 1075. Error detector 1040 may send to eDCI combiner 1050 payload bits along with flags indicating whether the payload bits correspond to a base eDCI 430 or associated extended eDCI 435 that has been properly received and addressed to the UE 115. Error detector 1040 may receive from eDCI combiner 1050 information regarding candidates eDCIs for further evaluation.

eDCI combiner 1050 may process explicit or implicit linking information associated with payload bits received from error detector 1040 and send to error detector 1040 information regarding additional candidate eDCIs that error detector 1040 is to evaluate. eDCI combiner 1050 may also form a DCI message 425 by combining a base payload 510 and an extended payload 610. In some examples eDCI combiner 1050 may determine that a length of the base payload 510 combined with one or more extended payloads 610 corresponds to an expected length of the DCI message 425. In some examples, eDCI combiner 1050 may determine that a DCI message 425 is complete, and combine a base payload 510, an extended payload 610, and a second extended payload 610 based on receiving information from error detector 1040 that the second extended payload 610 has successfully passed an error detecting algorithm. In some cases, the determining that the DCI message 425 is a complete DCI message 425 is based on a payload of a candidate extended eDCI within the set of decoding outputs 1060 failing an error detecting algorithm.

Figure 11:
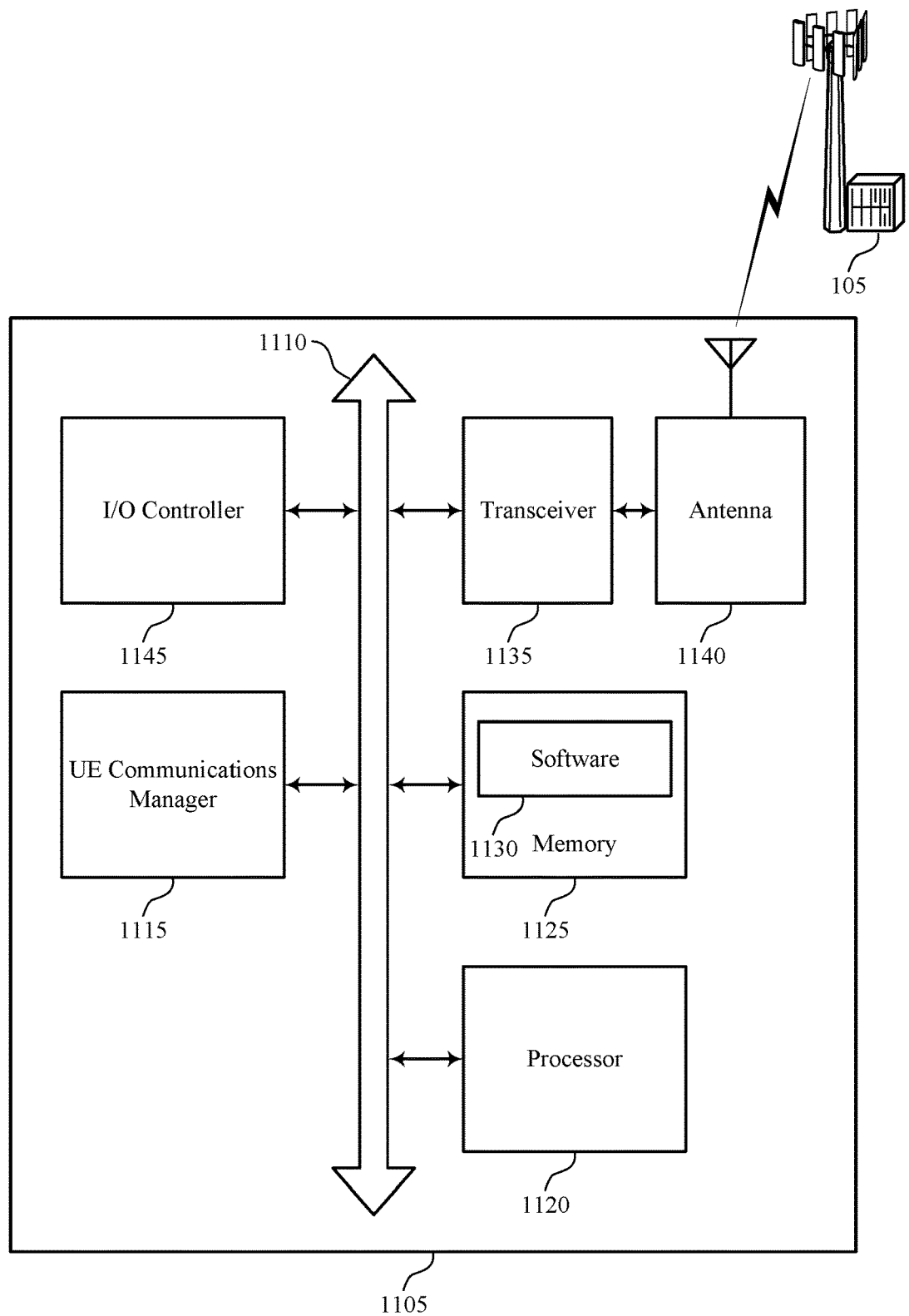
FIG. 11 illustrates a block diagram of a system such as a UE that supports efficient blind decoding of a search space in accordance with aspects of the present disclosure.

FIG. 11 shows a diagram of a system 1100 including a device 1105 that supports efficient blind decoding of a search space in accordance with various aspects of the present disclosure. Device 1105 may be an example of or include the components of wireless device 905, wireless device 1015, or a UE 115 as described above, e.g., with reference to FIGS. 1, 9 and 10. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120.

Processor 1120 may be configured to execute computer-readable instructions stored in a memory to perform various functions (e.g., functions or tasks supporting efficient blind decoding of a search space).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support efficient blind decoding of a search space. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system.

Figure 12:
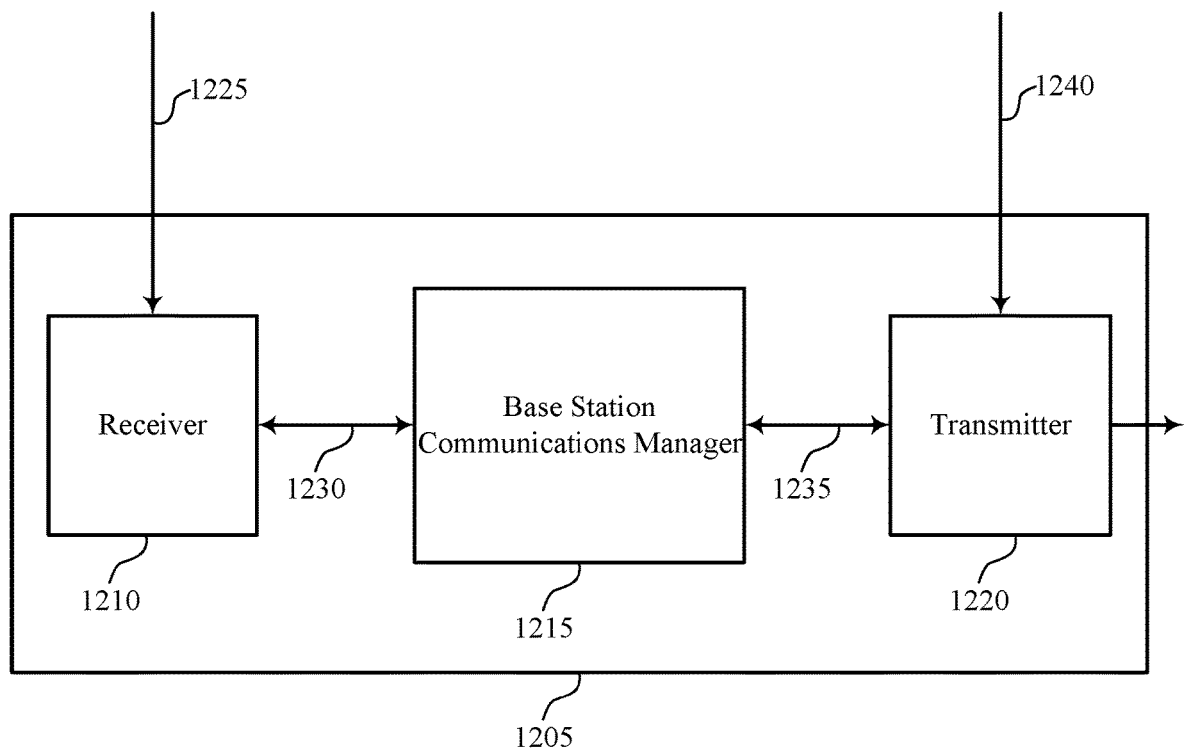
FIGS. 12 through 13 show block diagrams of a device that supports efficient blind decoding of a search space in accordance with aspects of the present disclosure.

FIG. 12 shows a block diagram 1200 of a wireless device 1205 that supports efficient blind decoding of a search space in accordance with various aspects of the present disclosure. Wireless device 1205 may be an example of aspects of a base station 105 as described with reference to FIG. 1. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive via communication link 1225 information such as packets, user data, or control information associated with various information channels (e.g., control channels, data channels, and information related to efficient blind decoding of a search space, etc.). Receiver 1210 may pass information on to other components of the device, such as base station communications manager 1215, and transmitter 1220, via communication link 1230. The receiver 1210 may be an example of aspects of the transceiver 1435 described with reference to FIG. 14.

Base station communications manager 1215 may be an example of aspects of the base station communications manager 1415 described with reference to FIG. 14.

Base station communications manager 1215 may receive input from Receiver 1210 via communication link 1225. Base station communications manager 1215 may generate a DCI message 425 for a UE 115, divide the DCI message 425 into a base payload 510 and one or more extended payloads 610, independently encode the base payload 510 and the one or more extended payloads 610 using an encoder to obtain a base eDCI 430 and one or more extended eDCIs 435, and link the base eDCI 430 with the one or more associated extended eDCIs 435 in a search space of a control channel.

Transmitter 1220 may receive input from base station communications manager 1215 via communication link 1235. For example, transmitter 1220 may receive data associated with a downlink control channel from base station communications manager 1215 via communication link 1235, which may include data associated with a search space that includes an encoded base eDCI 430 and one or more encoded extended eDCIs 435. Transmitter 1220 may transmit signals generated by other components of the device. Transmitter 1220 may transmit the encoded base eDCI 430 and the one or more encoded extended eDCIs 435 to a UE 115 in the control channel, which may comprise transmitting, to the UE 115, via communication link 1240, a search space as well as configuration data specifying a set of decoding candidates within the search space of the control channel or an aggregation level indicating a number of control channel elements for each of the base eDCI 430 and the one or more extended eDCIs 435. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
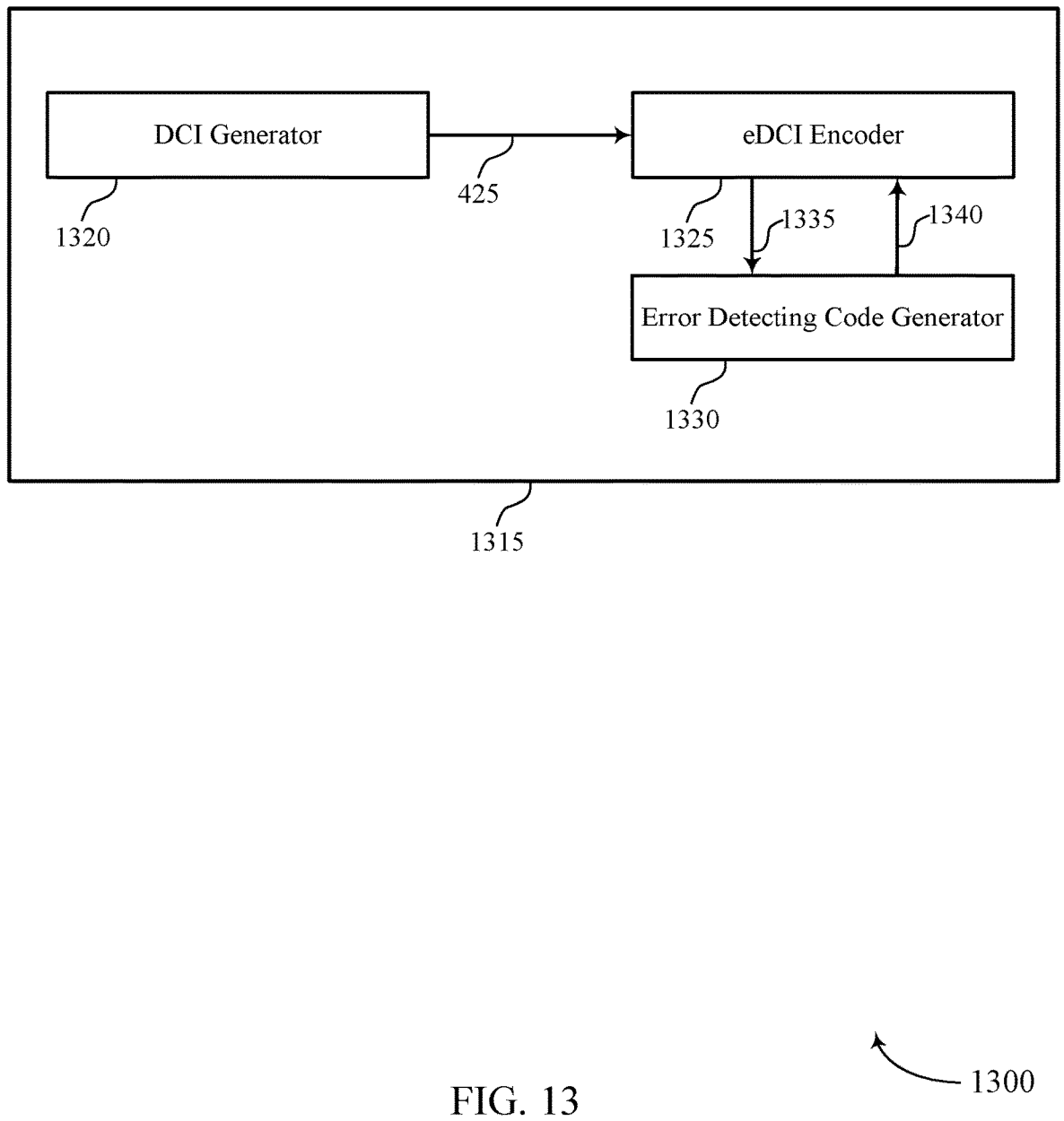

FIG. 13 shows a block diagram 1300 of a base station communications manager 1315 that supports efficient blind decoding of a search space in accordance with various aspects of the present disclosure. The base station communications manager 1315 may be an example of aspects of a base station communications manager 1215 and a base station communications manager 1415 described with reference to FIGS. 12 and 14. The base station communications manager 1315 may include DCI generator 1320, eDCI encoder 1325, and error detecting code generator 1330. Each of these modules may communicate, directly or indirectly, with one another (e.g., via one or more buses).

DCI generator 1320 may generate a DCI message 425 for a UE 115 and divide the DCI message 425 into a base payload 510 and one or more extended payloads 610. DCI generator 1320 may send the generated DCI message 425 to eDCI encoder 1325.

eDCI encoder 1325 may receive the generated DCI message 425 and independently encode the base payload 510 and the one or more extended payloads 610 using an encoder to obtain a base eDCI 430 and one or more associated extended eDCIs 435. In some cases, the base eDCI 430 and any associated extended eDCIs 435 are of the same length. eDCI encoder 1325 may link the base eDCI 430 with the one or more associated extended eDCIs 435 in a search space of a control channel. In some cases independently encoding a base payload 510 or an extended payload 610 includes determining a radio network identifier associated with the UE and scrambling the base eDCI 430 or extended eDCI 435 with the radio network identifier.

eDCI encoder 1325 may exchange information with error detecting code generator 1330. eDCI encoder 1325 may send to error detecting code generator 1330 bits 1335 for which error detecting code generator 1330 is to generate an error detecting code 1340, and error detecting code generator 1330 may respond to eDCI encoder 1325 with the generated error detecting code 1340.

For example, eDCI encoder 1325 may send to error detecting code generator 1330 bits associated with a base payload 510 or extended payload 610, and error detecting code generator 1330 may respond to eDCI encoder 1325 with a corresponding base error detecting code 515 or extended error detecting code 615. In some cases, independently encoding an extended payload 610 includes provisioning error detecting code generator 1330 to generate an error detecting code 615 corresponding to the extended payload 610, and mapping the extended payload 610 and the error detecting code 615 to a single extended eDCI 435. In some cases, the extended eDCI 435 is one of a set of extended eDCIs 435 having a shared error detecting code 615-*a*, and portions of the extended payload 610, the error detecting code 615-*a*, or both are included in two or more extended eDCIs 435 of the set of extended eDCIs 435.

Error detecting code generator 1330 may generate error detecting codes 1340 using an error detection algorithm. In some cases, error detecting code generator 1330 may use the radio network identifier as an input to the error detection algorithm or scramble the error detecting code based on the radio network identifier.

Figure 14:
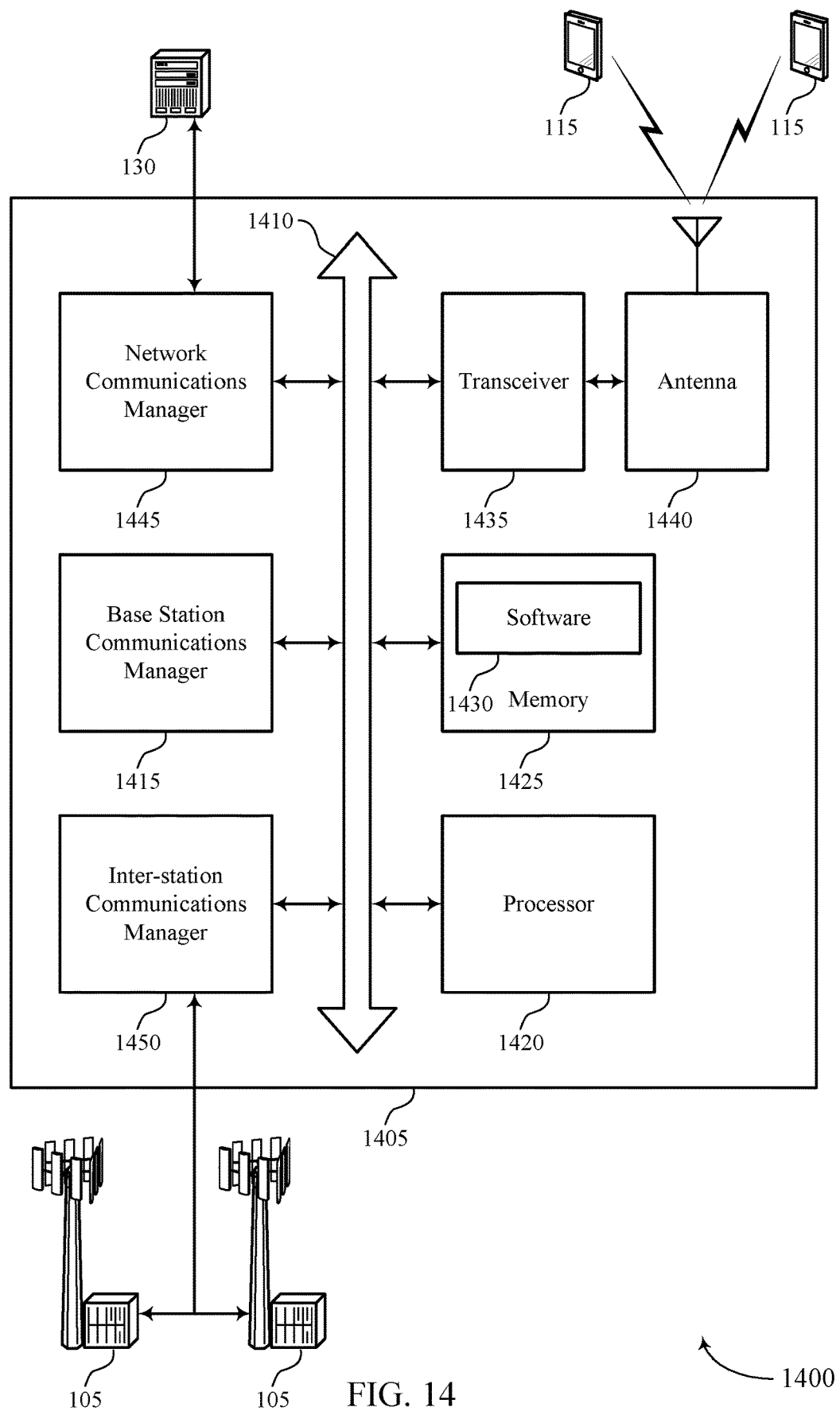
FIG. 14 illustrates a block diagram of a system such as a base station that supports efficient blind decoding of a search space in accordance with aspects of the present disclosure.

FIG. 14 shows a diagram of a system 1400 including a device 1405 that supports efficient blind decoding of a search space in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more busses (e.g., bus 1410). Device 1405 may communicate wirelessly with one or more UEs 115.

Base station communications manager 1415 may manage communications with other base stations 105, and may include a controller or scheduler for controlling communications with UEs 115 in cooperation with other base stations 105. For example, the base station communications manager 1415 may coordinate scheduling for transmissions to UEs 115 for various interference mitigation techniques such as beamforming or joint transmission. In some examples, base station communications manager 1415 may provide an X2 interface within an Long Term Evolution (LTE)/LTE-A wireless communication network technology to provide communication between base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting efficient blind decoding of a search space).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support efficient blind decoding of a search space. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
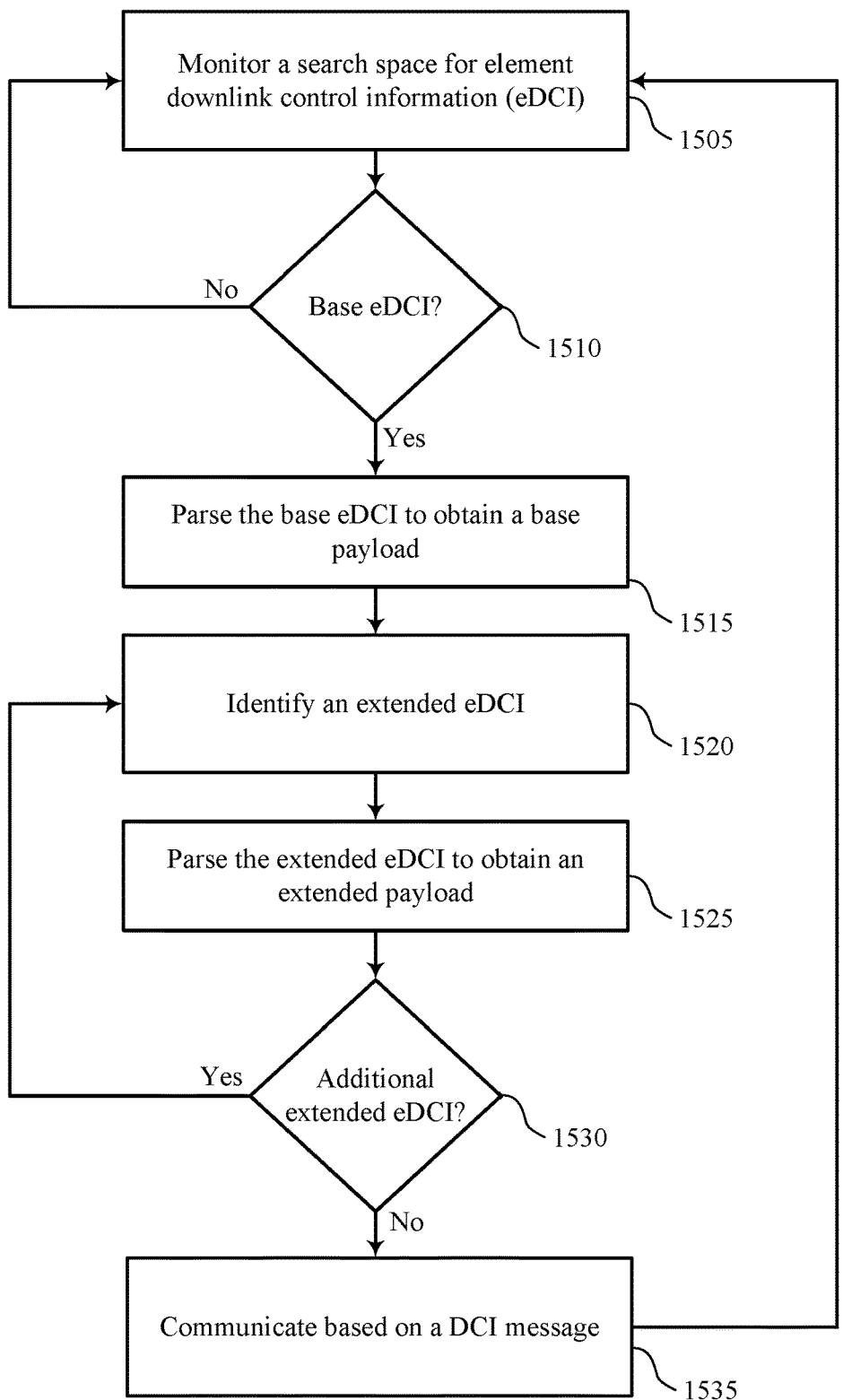
FIGS. 15 through 17 illustrate methods for efficient blind decoding of a search space in accordance with aspects of the present disclosure.

FIG. 15 shows a flowchart illustrating a method 1500 for efficient blind decoding of a search space in accordance with various aspects of the present disclosure. The operations of method 1500 may be implemented by a UE 115 or its components as described herein. For example, the operations of method 1500 may be performed by a UE communications manager as described with reference to FIGS. 9 through 11. In some examples, a UE 115 may execute a set of code to control the functional elements of the device to perform the functions described below. Additionally or alternatively, the UE 115 may perform aspects the functions described below using special-purpose hardware.

At block 1505 the UE 115 may monitor a search space of a control channel, such as a PDCCH, for eDCI by decoding a set of decoding candidates within the search space to generate a set of decoding outputs. The operations of block 1505 may be performed according to the methods described with reference to FIGS. 1 through 8. For example, the operations of block 1505 may include identifying CCEs corresponding to decoding candidates within the search space. In certain examples, aspects of the operations of block 1505 may be performed by a monitor component as described with reference to FIGS. 8 through 11.

At block 1510 the UE 115 may identify, among the set of decoding candidates, a base eDCI 430 corresponding to a radio network identifier associated with the UE. The operations of block 1510 may be performed according to the methods described with reference to FIGS. 1 through 8. For example, the operations of block 1510 may include decoding the decoding candidates identified at block 1505, descrambling the decoded CCEs using a radio network identifier, and checking at least some of the decoded and descrambled bits using an error detecting algorithm. The operations of block 1510 may further include determining that a CCE whose decoded and descrambled bits pass error detection comprises a base eDCI 430 that was properly received and addressed to the UE 115. If the UE identifies a base eDCI 430 at block 1510, it may proceed to block 1515; otherwise, the UE may return to monitoring the search space in accord with block 1505. In certain examples, aspects of the operations of block 1510 may be performed by an eDCI detector as described with reference to FIGS. 8 through 11.

At block 1515 the UE 115 may parse the base eDCI 430 to obtain a base payload 510. The operations of block 1515 may be performed according to the methods described with reference to FIGS. 1 through 8. For example, the operations of block 1515 may include separating bits from a base eDCI 430 identified at block 1510 in accord with a known format for base eDCIs 430 in order to isolate the base payload 510. In certain examples, aspects of the operations of block 1515 may be performed by a parser as described with reference to FIGS. 8 through 11.

At block 1520 the UE 115 may identify an extended eDCI 435 within the set of decoding outputs based at least in part on the base eDCI 430. The operations of block 1520 may be performed according to the methods described with reference to FIGS. 1 through 8. For example, the operations of block 1520 may include processing information in the base payload 510 obtained at block 1515 that explicitly links one or more associated extended eDCIs 435 or applying an implicit linking rule to identify one or more associated extended eDCIs 435. The operations of block 1520 may further include checking the identified extended eDCI 435 using an error detecting algorithm and determining that a successful error check indicates that the extended eDCI 435 was properly received and is addressed to the UE 115. In certain examples, aspects of the operations of block 1520 may be performed by an eDCI detector or an eDCI combiner as described with reference to FIGS. 8 through 11.

At block 1525 the UE 115 may parse the extended eDCI to obtain an extended payload. The operations of block 1525 may be performed according to the methods described with reference to FIGS. 1 through 8. For example, the operations of block 1525 may include separating bits from an extended eDCI 435 identified at block 1520 in accord with a known format for extended eDCIs 435 in order to isolate an extended payload 610 (or a portion of a shared extended payload 610-*a*). In certain examples, aspects of the operations of block 1525 may be performed by a parser as described with reference to FIGS. 8 through 11.

At block 1530 the UE 115 may determine whether an additional extended eDCI 435 is associated with the base eDCI 430 identified at block 1510 and the extended eDCI 435 identified at block 1520. The operations of block 1530 may be performed according to the methods described with reference to FIGS. 1 through 8. For example, the operations of block 1530 may include processing information in the base payload 510 parsed at block 1515 and the extended payload 610 parsed at block 1525. For example, either the base payload 510 or the extended payload 610 may include information regarding the existence of one or more additional associated extended eDCIs 435. As another example, the UE 115 may apply an implicit linking rule to determine whether an additional associated extended eDCI 435 exists. The operations of block 1530 may further include determining whether a combination of the base payload 510 and one or more extended payloads 610 already identified corresponds to an expected DCI length. If the UE 115 determines at block 1530 that an additional extended eDCI 435 exists, it may proceed to block 1520 to identify the additional extended eDCI 435; otherwise, the UE may proceed to block 1535. In certain examples, aspects of the operations of block 1520 may be performed by an eDCI detector or eDCI combiner as described with reference to FIGS. 8 through 11.

At block 1535 the UE 115 may communicate based at least in part on a DCI message formed by combining the base payload and the extended payload. The operations of block 1530 may be performed according to the methods described with reference to FIGS. 1 through 8. For example, the operations of block 1535 may include combining (e.g., concatenating) the base payload 510 parsed at block 1515, the extended payload 610 parsed at block 1525, and possibly the extended payloads 610 of one or more additional extended eDCIs identified at block 1530. In certain examples, aspects of the operations of block 1535 may be performed by an eDCI combiner as described with reference to FIGS. 9 through 11. After block 1535 the UE may return to monitoring the search space in accord with block 1505.

Figure 16:
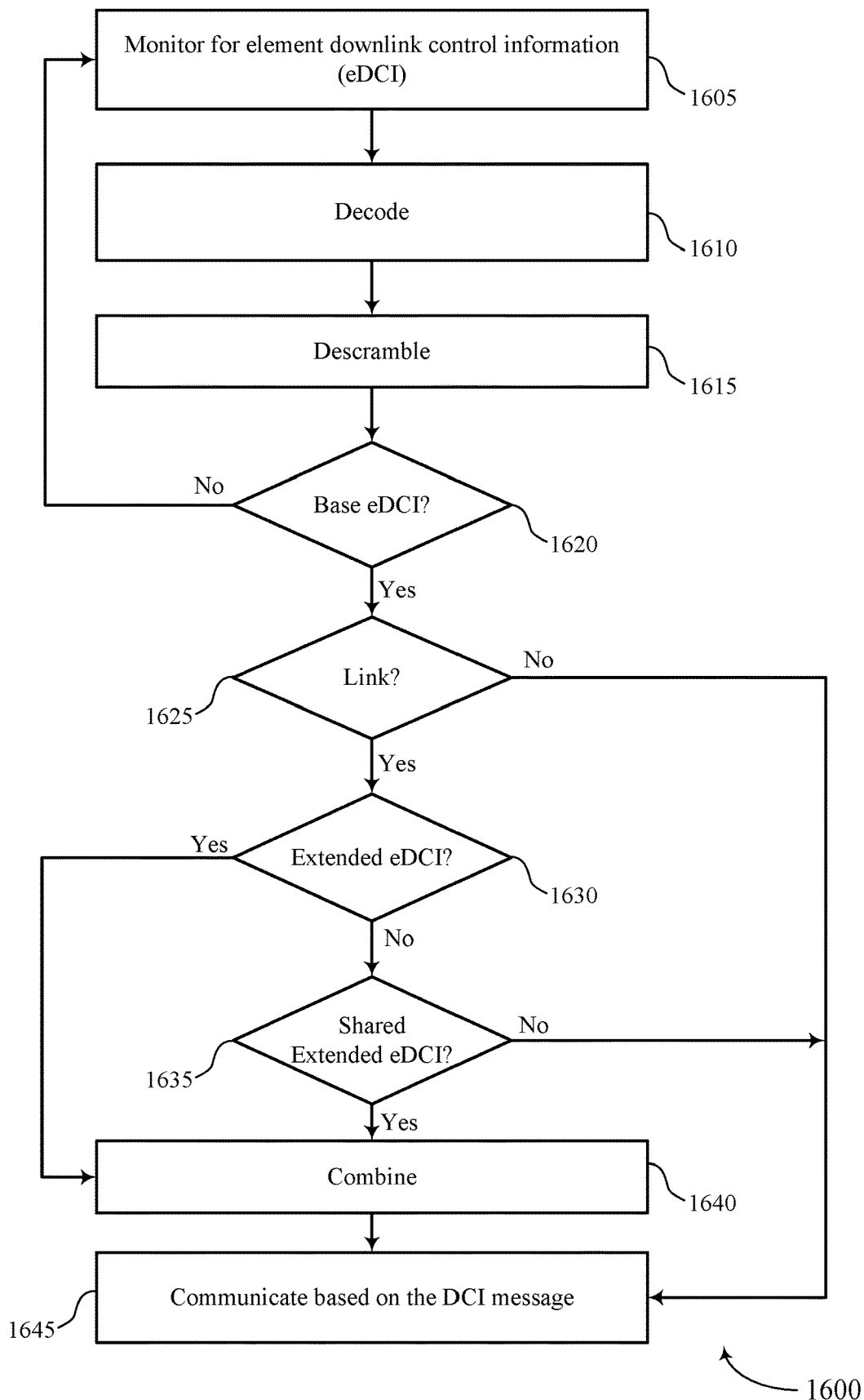

FIG. 16 shows a flowchart illustrating a method 1600 for efficient blind decoding of a search space in accordance with various aspects of the present disclosure. The operations of method 1600 may be implemented by a UE 115 or its components as described herein. For example, the operations of method 1600 may be performed by a UE communications manager and components therein as described with reference to FIGS. 8 through 11. In some examples, a UE 115 may execute a set of codes to control the functional elements of the device to perform the functions described below. Additionally or alternatively, the UE 115 may perform aspects the functions described below using special-purpose hardware.

At block 1605 the UE 115 may monitor a search space of a control channel, such as a PDCCH, for eDCI by decoding a set of decoding candidates within the search space to generate a set of decoding outputs. The operations of block 1605 may be performed according to the methods described with reference to FIGS. 1 through 8. For example, the operations of block 1605 may include identifying CCEs corresponding to decoding candidates within the search space. In certain examples, aspects of the operations of block 1605 may be performed by a monitor component as described with reference to FIGS. 8 through 11.

At block 1610 the UE 115 may decode any CCEs corresponding to decoding candidates as identified at block 1605. The operations of block 1610 may be performed according to the methods described with reference to FIGS. 1 through 8. In certain examples, aspects of the operations of block 1610 may be performed by a decoder as described with reference to FIGS. 8 through 11.

At block 1615 the UE 115 may descramble any decoded CCEs resulting from block 1610, using a radio network identifier, to generate one or more descrambled CCEs. The operations of block 1615 may be performed according to the methods described with reference to FIGS. 1 through 8. In certain examples, aspects of the operations of block 1615 may be performed by a descrambler as described with reference to FIGS. 8 through 11.

At block 1620 the UE 115 may determine whether any descrambled CCE resulting from block 1615 comprises a base eDCI 430. For example, the operations of block 1620 may include checking at least some of the decoded and descrambled bits using an error detecting algorithm, which may include parsing bits from each candidate base eDCI based on a known format for base eDCIs 430 in order to isolate one or more candidate base payloads and corresponding candidate base error detecting codes, calculating an error detecting code based on each candidate base payload, and comparing a calculated base error detecting code to a corresponding received candidate base error detecting code. The operations of block 1620 may further include determining that a CCE whose decoded and descrambled bits pass error detection (e.g., the calculated error detecting code matches the received error detecting code) comprises a base eDCI 430 that was properly received and addressed to the UE 115. If the UE 115 identifies a base eDCI 430 at block 1620, it may proceed to block 1620; otherwise, the UE 115 may return to monitoring the search space in accord with block 1605. The operations of block 1620 may be performed according to the methods described with reference to FIGS. 1 through 8. In certain examples, aspects of the operations of block 1620 may be performed by an eDCI detector as described with reference to FIGS. 8 through 11.

At block 1625 the UE 115 may determine whether an identified base eDCI 430 links to one or more extended eDCIs 435 and determine the location of any linked extended eDCI 435. Determining whether an identified base eDCI 430 links to one or more extended eDCIs 435 may comprise identifying one or more explicit links with the identified base eDCI 430. Determining whether an identified base eDCI 430 links to one or more extended eDCIs 435 may also comprise applying an implicit linking rule based on identified base eDCI 430. For any base eDCI identified at block 1620, if the UE 115 identifies explicit or implicit linking to one or more associated extended eDCIs 435, the UE 115 may proceed to block 1630; otherwise, the UE 115 may proceed to block 1645. The operations of block 1625 may be performed according to the methods described with reference to FIGS. 1 through 8. In certain examples, aspects of the operations of block 1625 may be performed by an eDCI combiner as described with reference to FIGS. 8 through 11.

At block 1630 the UE 115 may apply an error detecting algorithm to determine whether any linked extended eDCI 435 identified at block 1625 comprises a properly received and addressed extended eDCI 435. For example, the operations of block 1630 may include parsing bits from each candidate extended eDCI based on a known format (or a format indicated in the base eDCI 430) for extended eDCIs 435 in order to isolate one or more candidate extended payloads and corresponding candidate extended error detecting codes, calculating an error detecting code based on each candidate extended payload, and comparing a calculated extended error detecting code to a corresponding received candidate extended error detecting code. The operations of block 1630 may further include determining that a CCE whose decoded and descrambled bits pass error detection (e.g., the calculated error detecting code matches the received error detecting code) comprises an extended eDCI 435 that was properly received and addressed to the UE 115. If the UE 115 identifies one or more extended eDCIs 435 at block 1620, it may proceed directly to block 1640; otherwise, the UE 115 may proceed to block 1635. The operations of block 1630 may be performed according to the methods described with reference to FIGS. 1 through 8. In certain examples, aspects of the operations of block 1630 may be performed by an eDCI detector as described with reference to FIGS. 8 through 11.

At block 1635 the UE 115 may apply an error detecting algorithm to determine whether any linked extended eDCIs 435 identified at block 1625 collectively comprise a properly received and addressed extended eDCI 435 with an extended payload 610-*a* having a shared error detecting code 615-*a*. For example, the operations of block 1635 may include parsing bits from one or more candidate extended eDCI based on a known format (or a format indicated in the base eDCI 430) for extended eDCIs 435 in order to isolate one or more candidate extended payloads and corresponding candidate shared extended error detecting codes, calculating an error detecting code based on each candidate extended payload, and comparing a calculated shared error detecting code to a corresponding received candidate shared error detecting code. The operations of block 1635 may further include determining that a CCE whose decoded and descrambled bits pass error detection (e.g., the calculated error detecting code matches the received error detecting code) comprises an extended eDCI 435 with a shared error detecting code 615-*a* that was properly received and addressed to the UE 115. If the UE 115 identifies one or more extended eDCIs 435 with a shared error detecting code 615-*a* at block 1620, it may proceed to block 1640; otherwise, the UE 115 may proceed to block 1645. In some cases, for example if a base eDCI 430 identified at block 1620 or a linking identified at block 1625 indicates that any associated extended eDCIs 435 have a shared error detecting code 615-*a*, UE 115 may proceed directly from block 1625 to block 1635. The operations of block 1635 may be performed according to the methods described with reference to FIGS. 1 through 8. In certain examples, aspects of the operations of block 1635 may be performed by an eDCI detector as described with reference to FIGS. 8 through 11.

At block 1640 the UE 115 may combine (e.g., concatenate) a base payload 510 of any base eDCI 430 identified at block 1620 with the extended payload 610 of any associated extended eDCI 435 identified at either block 1630 or block 1635. The operations of block 1640 may be performed according to the methods described with reference to FIGS. 1 through 8. In certain examples, aspects of the operations of block 1640 may be performed by an eDCI combiner as described with reference to FIGS. 8 through 11.

At block 1645 the UE 115 may communicate based at least in part on a DCI message formed by combining a base payload 510 and one or more associated extended payloads 610. The operations of block 1645 may be performed according to the methods described with reference to FIGS. 1 through 8. In certain examples, aspects of the operations of block 1645 may be performed by an eDCI combiner and a transmitter or transceiver as described with reference to FIGS. 8 through 11.

Figure 17:
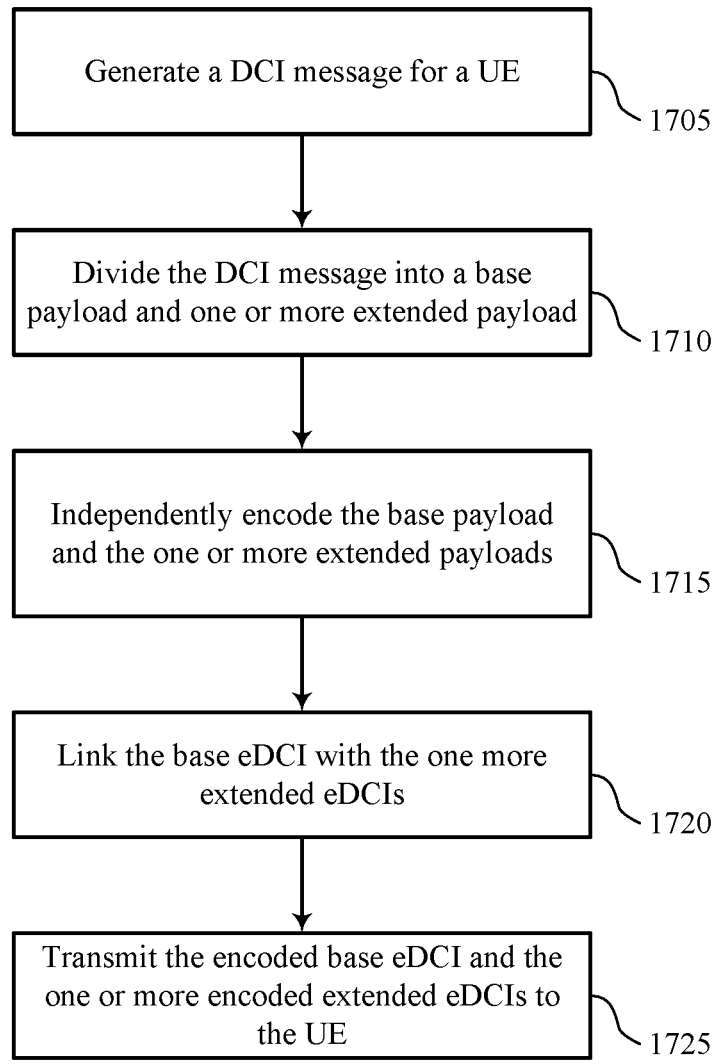

FIG. 17 shows a flowchart illustrating a method 1700 that supports efficient blind decoding of a search space in accordance with various aspects of the present disclosure. The operations of method 1700 may be implemented by a base station 105 or its components as described herein. For example, the operations of method 1700 may be performed by a base station communications manager as described with reference to FIGS. 12 through 14. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may generate a DCI message 425 for a UE 115. The operations of block 1705 may be performed according to the methods described with reference to FIGS. 1 through 8. In certain examples, aspects of the operations of block 1705 may be performed by a DCI generator as described with reference to FIGS. 12 through 14.

At block 1710 the base station 105 may divide the DCI message 425 into a base payload 510 and one or more extended payloads 610. The operations of block 1710 may be performed according to the methods described with reference to FIGS. 1 through 8. In certain examples, aspects of the operations of block 1710 may be performed by a DCI generator as described with reference to FIGS. 12 through 14.

At block 1715 the base station 105 may independently encode the base payload 510 and the one or more extended payloads 610 using an encoder to obtain a base eDCI 430 and one or more extended eDCIs 435. The operations of block 1715 may be performed according to the methods described with reference to FIGS. 1 through 8. In certain examples, aspects of the operations of block 1715 may be performed by a eDCI encoder as described with reference to FIGS. 12 through 14.

At block 1720 the base station 105 may link the base eDCI 430 with the one or more extended eDCIs 435 in a search space of a control channel. The operations of block 1720 may be performed according to the methods described with reference to FIGS. 1 through 8. In certain examples, aspects of the operations of block 1720 may be performed by a eDCI encoder as described with reference to FIGS. 12 through 14.

At block 1725 the base station 105 may transmit the encoded base eDCI 430 and the one or more encoded extended eDCIs 435 to the UE 115 in the control channel. The operations of block 1725 may be performed according to the methods described with reference to FIGS. 1 through 8. In certain examples, aspects of the operations of block 1725 may be performed by a transmitter as described with reference to FIGS. 12 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
monitoring, by the UE, a search space of a control channel for element downlink control information (eDCI) by decoding a set of decoding candidates within the search space to generate a set of decoding outputs;
identifying, by the UE, among the set of decoding outputs, a base eDCI corresponding to a radio network identifier, the base eDCI comprising a first subpart of a downlink control information (DCI) message having a DCI format;
parsing, by the UE, the base eDCI to obtain a base payload;
determining, by the UE, a location of an extended eDCI within the set of decoding outputs based at least in part on the base eDCI, the extended eDCI comprising a second subpart of the DCI message;
parsing, by the UE, the extended eDCI to obtain an extended payload;
combining, by the UE, the base payload and the extended payload to form the DCI message having the DCI format; and
communicating, by the UE, based at least in part on the DCI message formed by combining the base payload and the extended payload.

2. The method of claim 1, wherein determining the location of the extended eDCI comprises:
determining the location of the extended eDCI within the set of decoding outputs relative to a location of the base eDCI.

3. The method of claim 1, wherein determining the location of the extended eDCI comprises:
processing the base eDCI to obtain the location of the extended eDCI within the set of decoding outputs.

4. The method of claim 1, further comprising:
detecting that a link in the extended eDCI corresponds to a location of the base eDCI within the search space.

5. The method of claim 1, further comprising:
determining that a length of the base payload combined with the extended payload corresponds to an expected length of the DCI message; and
determining that the DCI message is a complete DCI message based at least in part on the expected length of the DCI message.

6. The method of claim 5, wherein determining that the DCI message is a complete DCI message is based at least in part on a payload of a candidate extended eDCI within the set of decoding outputs failing an error detecting algorithm.

7. The method of claim 1, further comprising:
determining a location of a second extended eDCI within the set of decoding outputs based at least in part on the extended eDCI, the second extended eDCI comprising a third subpart of the DCI message;
parsing the second extended eDCI to obtain a second extended payload; and
combining the base payload, the extended payload, and the second extended payload based at least in part on determining that the second extended payload has successfully passed an error detecting algorithm.

8. The method of claim 1, further comprising:
descrambling an error detecting code from the base eDCI using the radio network identifier to generate a descrambled error detecting code, wherein the descrambled error detecting code corresponds to the base payload;
applying an error detection algorithm to the base payload to generate a calculated error detecting code; and
determining a successful decode of the base payload based at least in part on the descrambled received error detecting code and the calculated error detecting code.

9. The method of claim 1, further comprising:
processing the extended eDCI to obtain a received error detecting code corresponding to the extended payload;
applying an error detection algorithm to the extended payload to generate a calculated error detecting code; and
determining a successful decode of the extended payload based at least in part on the received error detecting code and the calculated error detecting code.

10. The method of claim 1, further comprising:
decoding at least one other extended eDCI, the at least one other extended eDCI comprising a third subpart of the DCI message;
processing the extended eDCI and the at least one other extended eDCI to obtain a combined extended payload and a received error detecting code corresponding to the combined extended payload;
applying an error detection algorithm to the combined extended payload to generate a calculated error detecting code; and
determining a successful decode of the combined extended payload based at least in part on the received error detecting code and the calculated error detecting code.

11. The method of claim 1, further comprising:
processing configuration data specifying the set of decoding candidates within the search space or an aggregation level indicating a number of control channel elements within the search space for each of the decoding candidates.

12. The method of claim 1, wherein:
the set of decoding candidates corresponds to a plurality of possible DCI formats and a plurality of possible aggregation levels; and
each of the plurality of possible DCI formats corresponds to a same base eDCI length for each of the plurality of possible aggregation levels.

13. A method for wireless communication at a base station, comprising:
generating, by the base station, a downlink control information (DCI) message for a user equipment (UE);
dividing, by the base station, the DCI message into a base payload and an extended payload;
independently encoding, by the base station, the base payload and the extended payload to obtain a base element downlink control information (eDCI) and an extended eDCI;
linking, by the base station, the base eDCI with the extended eDCI in a search space of a control channel; and
transmitting, by the base station, the base eDCI and the extended eDCI to the UE in the search space.

14. The method of claim 13, wherein independently encoding the base payload comprises:
determining a radio network identifier associated with the UE;
generating an error detecting code for the base payload using an error detection algorithm; and
scrambling the error detecting code based at least in part on the radio network identifier.

15. The method of claim 13, wherein independently encoding the extended payload comprises:
- generating an error detecting code corresponding to the extended payload; and
- mapping the extended payload and the error detecting code to a single extended eDCI.

16. The method of claim 13, wherein independently encoding the extended payload comprises:
- generating an error detecting code corresponding to the extended payload, wherein the extended eDCI is one of a plurality of extended eDCIs, and portions of the extended payload, the error detecting code, or both are included in two or more extended eDCIs of the plurality of extended eDCIs.

17. The method of claim 13, further comprising:
- transmitting, to the UE, configuration data specifying a set of decoding candidates within the search space of the control channel or an aggregation level indicating a number of control channel elements for each of the base eDCI and the extended eDCI.

18. The method of claim 13, wherein dividing the DCI message into the base payload and the extended payload comprises:
- determining a length of the DCI message;
- allocating to the base payload a portion of the DCI message having a length equal to a fixed base eDCI length; and
- allocating to the extended payload a remaining portion of the DCI message.

19. An apparatus for wireless communication at a user equipment (UE), comprising:
- a processor;
- memory in electronic communication with the processor; and
- instructions stored in the memory and operable, when executed by the processor, to cause the apparatus to:
  - monitor, by the UE, a search space of a control channel for element downlink control information (eDCI) by decoding a set of decoding candidates within the search space to generate a set of decoding outputs;
  - identify, by the UE, among the set of decoding outputs, a base eDCI corresponding to a radio network identifier, the base eDCI comprising a first subpart of a downlink control information (DCI) message having a DCI format;
  - parse, by the UE, the base eDCI to obtain a base payload;
  - determine, by the UE, a location of an extended eDCI within the set of decoding outputs based at least in part on the base eDCI, the extended eDCI comprising a second subpart of the DCI message;
  - parse, by the UE, the extended eDCI to obtain an extended payload;
  - combine, by the UE, the base payload and the extended payload to form the DCI message having the DCI format; and
  - communicate, by the UE, based at least in part on the DCI message formed by combining the base payload and the extended payload.

20. The apparatus of claim 19, wherein determining the location of the extended eDCI comprises:
- determining the location of the extended eDCI within the set of decoding outputs relative to a location of the base eDCI.

21. The apparatus of claim 19, wherein determining the location of the extended eDCI comprises:
- processing the base eDCI to obtain the location of the extended eDCI within the set of decoding outputs.

22. The apparatus of claim 19, wherein the instructions are further executable by the processor to:
- detect that a link in the extended eDCI corresponds to a location of the base eDCI within the search space.

23. The apparatus of claim 19, wherein the instructions are further executable by the processor to:
- determine that a length of the base payload combined with the extended payload corresponds to an expected length of the DCI message; and
- determine that the DCI message is a complete DCI message based at least in part on the expected length of the DCI message.

24. The apparatus of claim 23, wherein determining that the DCI message is a complete DCI message is based at least in part on a payload of a candidate extended eDCI within the set of decoding outputs failing an error detecting algorithm.

25. The apparatus of claim 19, wherein the instructions are further executable by the processor to:
- determine a location of a second extended eDCI within the set of decoding outputs based at least in part on the extended eDCI, the second extended eDCI comprising a third subpart of the DCI message;
- parse the second extended eDCI to obtain a second extended payload; and
- combine the base payload, the extended payload, and the second extended payload based at least in part on determining that the second extended payload has successfully passed an error detecting algorithm.

26. The apparatus of claim 19, wherein the instructions are further executable by the processor to:
- decode at least one other extended eDCI, the at least one other extended eDCI comprising a third subpart of the DCI message;
- process the extended eDCI and the at least one other extended eDCI to obtain a combined extended payload and a received error detecting code corresponding to the combined extended payload;
- apply an error detection algorithm to the combined extended payload to generate a calculated error detecting code; and
- determine a successful decode of the combined extended payload based at least in part on the received error detecting code and the calculated error detecting code.

27. The apparatus of claim 19, wherein:
- the set of decoding candidates corresponds to a plurality of possible DCI formats and a plurality of possible aggregation levels; and
- each of the plurality of possible DCI formats corresponds to a same base eDCI length for each of the plurality of possible aggregation levels.

28. An apparatus for wireless communication at a base station, comprising:
- a processor;
- memory in electronic communication with the processor; and
- instructions stored in the memory and operable, when executed by the processor, to cause the apparatus to:
  - generate, by the base station, a downlink control information (DCI) message for a user equipment (UE);
  - divide, by the base station, the DCI message into a base payload and an extended payload;
  - independently encode, by the base station, the base payload and the extended payload to obtain a base element downlink control information (eDCI) and an extended eDCI;

link, by the base station, the base eDCI with the extended eDCI in a search space of a control channel; and transmit, by the base station, the base eDCI and the extended eDCI to the UE in the search space.

29. The apparatus of claim 28, wherein independently encoding the extended payload comprises:
generating an error detecting code corresponding to the extended payload, wherein the extended eDCI is one of a plurality of extended eDCIs, and portions of the extended payload, the error detecting code, or both are included in two or more extended eDCIs of the plurality of extended eDCIs.

30. The apparatus of claim 28, wherein the base eDCI and the extended eDCI are of an equal and fixed length.

* * * * *